(12) United States Patent
Pinnavaia et al.

(10) Patent No.: US 6,702,993 B2
(45) Date of Patent: Mar. 9, 2004

(54) ULTRASTABLE HEXAGONAL, CUBIC AND WORMHOLE ALUMINOSILICATE MESOSTRUCTURES

(75) Inventors: Thomas J. Pinnavaia, East Lansing, MI (US); Wenzhong Zhang, Broken Arrow, OK (US); Yu Liu, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 4 days.

(21) Appl. No.: 10/128,065

(22) Filed: Apr. 23, 2002

(65) Prior Publication Data

US 2002/0182143 A1 Dec. 5, 2002

Related U.S. Application Data

(62) Division of application No. 09/578,315, filed on May 25, 2000, now Pat. No. 6,585,952.

(51) Int. Cl.[7] .................. C01B 33/26; B01J 29/03
(52) U.S. Cl. .................. 423/328.1; 423/328.2; 423/702; 502/182; 502/263; 501/80; 501/81
(58) Field of Search .................. 423/702, 328.1, 423/328.2; 502/182, 263; 501/80, 81

(56) References Cited

U.S. PATENT DOCUMENTS

| | | | |
|---|---|---|---|
| 3,574,538 A | | 4/1971 | McDaniel et al. |
| 3,671,191 A | | 6/1972 | Maher et al. |
| 3,789,107 A | | 1/1974 | Elliott |
| 3,808,326 A | | 4/1974 | McDaniel et al. |
| 4,178,352 A | | 12/1979 | Vaughan et al. |
| 5,750,085 A | * | 5/1998 | Yamada et al. .......... 423/382.2 |
| 5,883,035 A | * | 3/1999 | Yang .................. 502/81 |
| 5,942,208 A | * | 8/1999 | Ryoo et al. ............ 423/705 |
| 6,284,696 B1 | * | 9/2001 | Koya et al. ............ 502/64 |

OTHER PUBLICATIONS

Ryoo, R., et al., Chem. Commun. 2225 (1997).
Luan, Z.H., et al., J. Phys. Chem. 99 10590 (1995).
Corma, A., et al., J. Catal. 148 569 (1994).
Beck, J.S., et al., J. Am. Chem. Soc. 114 10834 (1992).
Chen, C–Y., et al., Microporous Mater. 2 17 (1993).
Borade, R.B., et al., Catal. Lett 31 267 (1994).
Janicke, M.T., et al., Chem. Mater. 11 1342 (1999).
Hamdan, H., et al., J. Chem. Soc. Faraday Trans. 92 2311 (1996).
Mokaya, R., et al., Chem. Commun. 2185 (1997).
Ryoo, R., et al., Chem. Mater. 9 1607 (1998).
Corma, A., Chem. Rev. 2373 (1997).
Angew. Chem. Int. Ed. 38 No. 19, 2930 (1999).
Lechert et al., Stud. Surf. Sci. Catal., 84, 147 (1994).
Robson ACS Sym. Ser., 398, 436 (1989).
Lok et al. Zeolites, 3, 282 (1983).
J.N. Watson et al., J. Chem. Soc., Faraday Trans. (94) 2181 (1998).
P.P.E.A. de Moor, et al., Chem. Mater. (11) 36 (1999).
P.P.E.A. de Moor, et al. J. Phys. Chem. B (103) 1639 (1999).
S.I. Zones et al., Microporous Mesoporous. Mater. 21, 199 (1998).
Lippmaa et al., J. Amer. Chem. Soc. 108 1730 (1986).
White et al., J. Chem. Soc., Faraday Trans. 1998, 94, 2181.
Ryoo, J. Phys. Chem. 1995, 99, 16742.
Kloetstra et al, Chem. Commun., 2281 (1997).

* cited by examiner

*Primary Examiner*—David Sample
(74) *Attorney, Agent, or Firm*—Ian C. McLeod

(57) ABSTRACT

Mesoporous hexagonal, cubic or wormhole aluminosilicates derived from zeolite seeds using an ionic structure directing agent are described. The aluminum in the structures is stable so that the framework of the structures does not collapse when heated in the presence of water or water vapor (steam). The steam stable aluminosilicates can be used as acid catalysts for hydrocarbon conversions, including the fluidized bed catalytic cracking and the hydrocracking of petroleum oils, and other cracking of organic compounds.

4 Claims, 15 Drawing Sheets

Testing of Mokaya's Al-MCM-41(Si/Al=6.1)

ULTRASTABLE HEXAGONAL, CUBIC AND WORMHOLE ALUMINOSILICATE MESOSTRUCTURES

This application is a divisional of application Ser. No. 09/578,315 filed on May 25, 2000 now U.S. Pat. No. 6,585,952.

STATEMENT REGARDING FEDERALLY FUNDED RESEARCH AND DEVELOPMENT

This invention was developed under National Science Foundation Grant Nos. CHE-9633798 and CHE-9903706. The U.S. government has certain rights to this invention.

BACKGROUND OF THE INVENTION (1) Field of the Invention

The present invention relates to mesoporous aluminosilicate compositions which have a unique structure which are stable at high temperatures and under hydrothermal conditions. In particular, the present invention relates to a process for producing the mesoporous aluminosilicate composition which uses a zeolite seed with a structure directing agent. Further still, the present invention relates to novel cracking catalysts for oil and other organic molecules. The present invention thus provides for the assembly of ultrastable mesoporous aluminosilicates with hexagonal, cubic and wormhole framework structures that do not suffer from the undesirable extensive de-alumination and steam instability of conventional aluminosilicate mesostructures.

(2) Description of Related Art

All previously reported aluminosilicate mesostructures, as prepared by either direct or post synthesis alumination, results in the extensive de-alumination of the framework upon calcination (Ryoo, R., et al., Chem. Commun. 2225 (1997); and Luan, Z. H., et al., J. Phys. Chem. 99 10590 (1995)). This undesired property has been attributed to the hydrolysis of the framework Al by steam generated in the calcination process (Corma, A., et al., J. Catal. 148 569 (1994); and Luan, Z. H., et al., J. Phys. Chem. 99 10590 (1995)). Regardless of the mechanism responsible for the de-alumination process, the acid catalytic properties of these materials for organic chemical conversions is greatly compromised. Moreover, all previously reported aluminosilicate mesostructures completely lose their framework mesoporosity when exposed to steam at the temperatures normally encountered in the processing of petroleum catalysts.

Soon after the discovery of mesoporous MCM-41 molecular sieves (Beck, J. S., et al., J. Am. Chem. Soc. 114 10834 (1992)), it was found that the incorporation of aluminum into the framework introduced mild acidic functionality, but the long range order and tetrahedral siting of the aluminum was compromised (Chen, C-Y., et al., Microporous Mater. 2 17 (1993); Borade, R. B., et al., Catal. Lett 31 267 (1994); Luan, Z. H., et al., J. Phys. Chem. 99 10590 (1995)), especially at intended aluminum loadings above about 8 mol %. Mild acidity and loss of structural integrity, together with poor steam stability under regeneration conditions made hexagonal Al-MCM-41 compositions unattractive candidates for the processing of high molecular weight petroleum fractions. More recently, important advances have been made in improving the structural integrity of Al-MCM-41 through direct assembly (Janicke, M. T., et al., Chem. Mater. 11 1342 (1999)) and post synthesis modification methods (Hamdan, H., et al., J. Chem. Soc. Faraday Trans 92 2311 (1996); Mokaya, R., et al., Chem. Commun. 2185 (1997); Ryoo, R., et al., J. Chem. Commun. 2225 (1997); and Ryoo, R., et al., Chem. Mater. 9 1607 (1998)). However, the low acidity and poor steam stability still limit potential applications in petroleum refining (Corma, A., Chem. Rev. 2373 (1997)).

There is thus a need for improved aluminosilicate compositions that are stable, particularly in the presence of steam. In particular, the present invention relates to aluminosilicates that have stable framework structures.

SUMMARY OF THE INVENTION

The present invention relates to a mesostructured aluminosilicate composition that comprises:

(a) a framework of linked tetrahedral $SiO_4$ and $AlO_4$ units, the framework defining mesopores having an onium ion surfactant in the mesopores, having an Si to Al molar ratio of between about 1000 to 1 and 1 to 1, and having at least one X-ray diffraction peak corresponding to a basal spacing between about 3.0 and 15.0 nm, and wherein the composition is derived from zeolite seeds.

The present invention also relates to a mesoporous aluminosilicate composition that comprises: a framework of tetrahedral linked $SiO_4$ and $AlO_4$ units, the framework defining mesopores having an Si to Al molar ratio of between about 1000 to 1 and 1 to 1, and having at least one X-ray diffraction peak corresponding to a basal spacing between about 3.0 and 15.0 nm, wherein the composition is derived from zeolite seeds, wherein a BET surface area is between 400 and 1300 $m^2$ per gram, wherein an average pore size of the framework is between about 2.0 and 10.0 nm, and wherein a pore volume of the framework is between about 0.30 and 1.3 $cm^3$ per gram. The framework can contain 0.01 to 10% by weight carbon.

The present invention relates to a mesostructured aluminosilicate composition which comprises: framework of linked tetrahedral $SiO_4$ and $AlO_4$ units, the framework defining mesopores having an onium ion surfactant in the mesopores, having an Si to Al molar ratio of between about 1000 and 1 and 1 to 1, and having at least one X-ray diffraction peak corresponding to a basal spacing between about 3.0 and 15.0 nm, and wherein the tetrahedral $AlO_4$ in the framework exhibit a $^{27}Al$ MAS-NMR resonance with a chemical shift between about 57 and 65 ppm relative to a 1.0 M aluminum nitrate solution as an external chemical shift reference.

The present invention also relates to a mesoporous aluminosilicate composition which comprises framework of a linked tetrahedral $SiO_4$ and $AlO_4$ units, having an Si to Al molar ratio of between about 1000 to 1 and 1 to 1, and having at least one X-ray diffraction peak corresponding to a basal spacing between about 3.0 and 15.0 nm, wherein the tetrahedral $AlO_4$ units exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 $m^2$ per gram, wherein an average pore size of the framework is between about 2.0 and 10.0 nm, and wherein a pore volume of the framework is between about 0.1 and 1.9 $cm^3$ per gram.

The present invention also relates to a hybrid mesoporous aluminosilicate-carbon composition which comprises framework of linked tetrahedral $SiO_4$ and $AlO_4$ units, the framework defining mesopores having a Si to Al molar ratio of between about 1000 to 1 and 1 to 1 and between 0.01 and 10 wt % carbon embedded in the mesopores, and having at least one X-ray diffraction peak corresponding to a basal spacing between about 3.0 and 15.0 nm, wherein the tetrahedral $AlO_4$ units in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 m² per gram, wherein an average pore size of the framework is between about 2.0 and 10.0 nm, and wherein a pore volume of the framework is between about 0.1 and 1.9 cm³ per gram.

The present invention further relates to a method for forming the mesoporous aluminosilicate composition that comprises:

(a) reacting a sodium silicate solution at basic pH with a sodium aluminate solution at an aluminum to silicon ratio between about 1000 to 1 and 1 to 1 and aging the mixture at 25 to 200° C. for periods of up to 48 hours to form zeolite seeds;

(b) diluting the reaction mixture from (a) with water and reacting the resultant mixture with a surfactant containing an onium ion;

(c) acidifying the mixture obtained from (b) with a protonic acid to obtain a mixture with an $OH^{31}/(Si+Al)$ ratio in the range of 0.10 to 1.0;

(d) aging the mixture from step (c) at a temperature between 80 and 200° C. to obtain a precipitate of the composition; and (e) separating the composition from mixture of step (d).

The present invention also relates to a method for forming the mesoporous aluminosilicate composition which comprises:

(a) providing an aqueous solution of zeolite seeds;

(b) reacting the zeolite seeds in the aqueous solution with a surfactant containing an onium ion wherein the solution has an $OH^-/(Si+Al)$ ratio in the range of 0.5 to 5.0;

(c) aging the mixture from step (b) at a temperature between 80 and 200° C. to obtain a precipitate of the composition; and (d) separating the composition from mixture of step (c).

The present invention also relates to a catalyst for a fluidized bed catalytic cracking (FCC) and hydrocracking of organic molecules that comprises:

(a) a mesoporous aluminosilicate composition that comprises a framework of linked tetrahedral $SiO_4$ and $AlO_4$ units, the framework defining mesopores having an Si to Al molar ratio of between about 1000 to 1 and 1 to 1, and having at least one X-ray diffraction peak corresponding to a basal spacing between about 3.0 and 15.0 nm, wherein the tetrahedral $AlO_4$ units in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 m² per gram, wherein an average pore size of the framework is between about 2.0 and 10.0 nm, and wherein a pore volume of the framework is between about 0.1 and 1.9 cm³ per gram; and (b) a binder for the aluminosilicate composition and other beneficial components of the catalyst particle.

The present invention also relates to a catalyst for fluidized bed catalytic cracking (FCC) and hydrocracking of an organic molecule which comprises:

(a) a mesoporous aluminosilicate-carbon composition which comprises an oxygen-metal framework of a silicon ions and aluminum ions, which have linked $SiO_4$ and $AlO_4$ structure, the framework defining mesopores having a Si to Al molar ratio of between about 1000 to 1 and 1 to 1 and between 0.01 and 10 wt % carbon embedded in the mesopores, and having at least one X-ray diffraction peak corresponding to a basal spacing between about 3.0 and 15.0 nm, wherein the aluminum ions in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 m² per gram, wherein an average pore size of the framework is between about 2.0 and 10.0 nm, and wherein a pore volume of the framework is between about 0.1 and 1.9 cm³ per gram; and wherein the carbon content is between about 0.01 and 10 wt %; and (b) a binder for the aluminosilicate-carbon composition and optionally other components which facilitate catalytic cracking.

The present invention relates to a method for bed catalytic cracking or hydrocracking of an organic molecule into lower molecular weight components, which comprises:

(a) providing in a reactor a bed catalytic cracking catalyst which comprises: a mesoporous aluminosilicate composition which comprises an oxygen metal framework and silicon ions and aluminum ions, which have a linked $SiO_4$ and $AlO_4$ structure, the framework defining mesopores having an Si to Al molar ratio of between about 1000 to 1 and 1 to 1, and having at least one X-ray diffraction peak corresponding to a basal spacing between about 3.0 and 15.0 nm, wherein the aluminum ions in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 m² per gram, wherein an average pore size of the framework is between about 2.0 and 10.0 nm, and wherein a pore volume of the framework is between about 0.1 and 1.9 cm³ per gram; and a binder for the aluminosilicate composition; and (b) introducing the oil onto the catalyst at temperatures and pressures which cause cracking of the organic molecule into the lower molecular weight components.

Finally, the present invention relates to a method for catalytic cracking or hydrocracking of an organic molecule into lower molecular weight components, which comprises:

(a) providing in a reactor a catalytic cracking catalyst which comprises: a mesoporous aluminosilicate-carbon composition which comprises an oxygen-metal framework of a silicon ions and aluminum ions, which have linked $SiO_4$ and $AlO_4$ structure, the framework defining mesopores having a Si to Al molar ratio of between about 1000 to 1 and 1 to 1 and between 0.01 and 10 wt % carbon embedded in the mesopores, and having at least one X-ray diffraction peak corresponding to a basal spacing between about 3.0 and 15.0 nm, wherein the aluminum ions in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 m² per gram, wherein an average pore size of the framework is between about 2.0 and 10.0 nm, and wherein a pore volume of the framework is between about 0.1 and 1.9 cm³ per gram; and a binder for the aluminosilicate-carbon composition; and (b) introducing the organic molecule onto the catalyst at temperatures and pressures which cause cracking of the oil into the lower molecular weight components.

The compositions of the present invention can be used for hydroprocessing of petroleum, especially hydrocracking processes wherein petroleum fractions, for example, distillates or resid fractions, are cracked to lower molecular weight fractions of useful hydrocarbons in the presence of hydrogen gas. The beds for the catalytic cracking can be fluidized. Usually the beds for hydrocracking are fixed.

DESCRIPTION OF PREFERRED EMBODIMENTS

Figure 1:
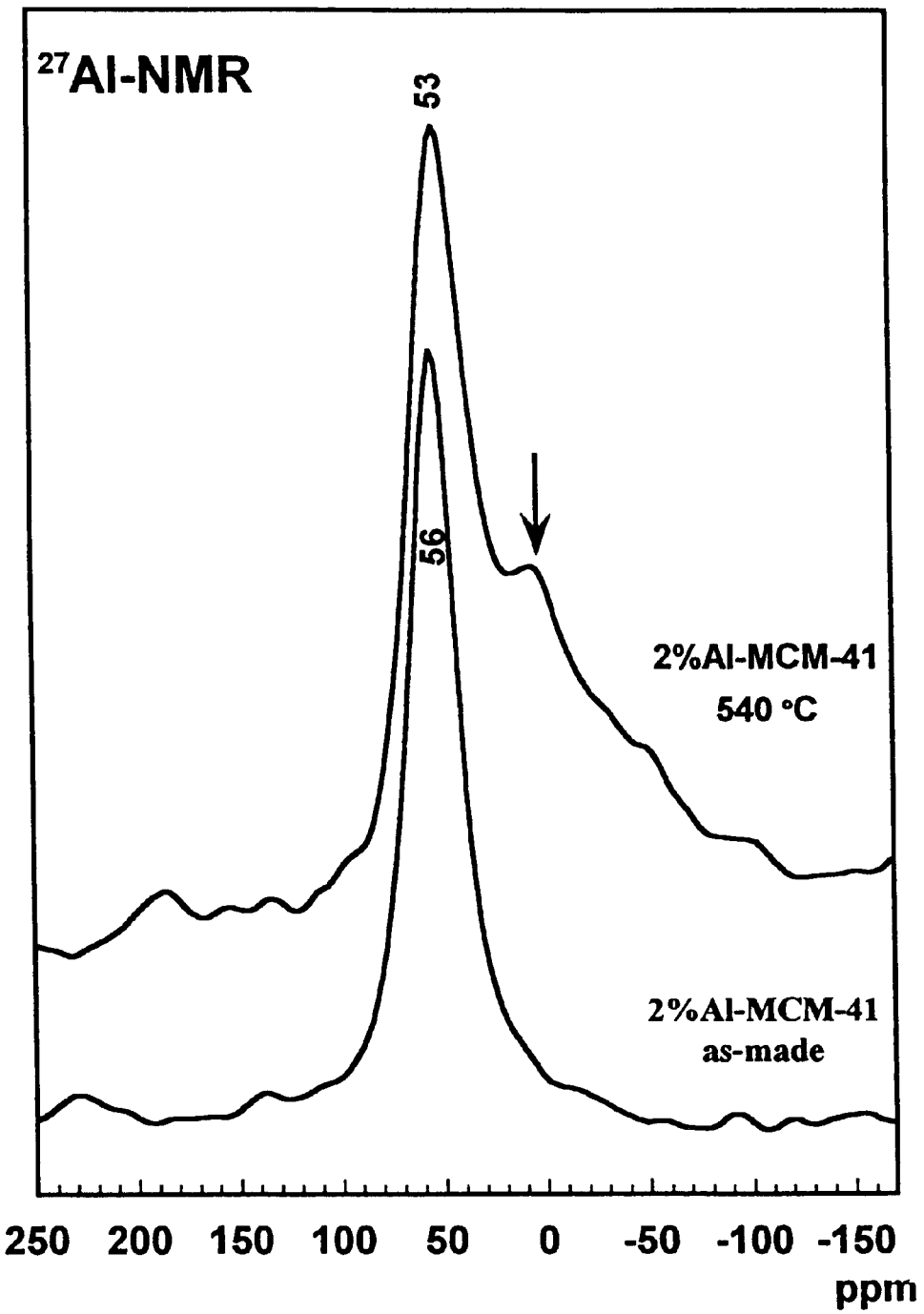
FIG. 1 provides the $^{27}$Al MAS NMR spectra for the as-made and calcined forms of a 2% Al-MCM-41 aluminosilicate mesostructure prepared from conventional aluminate and silicate precursors. The arrow points to the resonance near 0 ppm that is indicative of six-coordinated $AlO_6$ centers in the calcined mesostructure.

This invention provides the structurally distinct families of mesoporous aluminosilicates that are stable solid acid catalysts under the harsh steaming conditions encountered in the regeneration of the catalyst in processes such as the refining of petroleum. This result has been achieved without added reagent or processing costs in comparison to the costs for producing conventional mesostructures. The large framework pore sizes (2.0–10.0 nm) make these new materials especially desirable as cracking catalysts or hydrocracking catalysts for the refining of "heavy crudes" containing very high molecular weight fractions.

The approach for making ultrastable aluminosilicate mesostructures is to prepare first a reaction mixture of nanometer-sized anionic aluminosilicate clusters that contain primarily four-coordinated aluminum and silicon as linked tetrahedral $AlO_4$ and $SiO_4$ units. These nanoclustered aluminosilicate anions are then further linked into a mesoporous framework structure through supramolecular assembly reaction in the presence of a structure-directing surfactant, most preferably a quaternary ammonium ion surfactant. The surfactant can contain ammonium, phosphonium or arsonium ions in an organic molecule. The displacement of alkali metal ions, organic ions and surfactant from the as-made mesostructure provides a mesoporous structure with unique thermal and hydrothermal stability in comparison to previously disclosed aluminosilicate mesostructures. Most preferred are the mesoporous structures obtained by displacing the sodium ions, organic ions and most of the surfactant by treatment with a solution of ammonium ions ($NH_4^+$). The calcination of these $NH_4^+$-exchanged forms of the compositions at temperatures above about 500° C. removes residual surfactant and converts the ammonium ions to protons, thus affording a stable solid acid for catalyzing a variety of organic chemical conversions, especially alkylation reactions, isomerization reactions, cracking reactions, hydrocracking reactions, and hydrotreating reactions. The resulting acidic compositions can be easily incorporated as an active component of a conventional catalyst particle to improve catalytic conversions.

In particular, an enhancement in the catalytic performance properties of FCC (fluidized bed catalytic cracking) particles can be expected by incorporating into the particle matrix the steam-stable mesoporous compositions of the present invention as a component capable of cracking a high fraction of the petroleum that comprises the resid or heavy end fraction of the petroleum.

The nanoclustered aluminosilicate anions used to form the stable mesostructures of this invention are known in the art of zeolite chemistry as nucleating agents or, more generally, as "zeolite seeds". They are given this term because they can be crystallized into a specific atomically ordered zeolite upon aging them as a solution, gel, or wet solid at elevated temperatures. In addition, some zeolite seeds can promote the nucleation and crystallization of a specific zeolite when they are added in small amounts to reaction mixtures of silicate and aluminate ions that would not normally form the desired zeolite of interest under equivalent conditions in the absence of the added seeds. In general, zeolite seeds can have two physical forms, namely, they can be in the form of sub-micrometer crystalline particles of the same zeolite that they nucleate, or they can be amorphous nanoclusters in solution, gel or solvent-suspended form. The sub-micrometer forms are often referred to as "crystalline seeds" whereas the amorphous nanoclustered forms are often called "nucleating centers, gels, solutions, agents, etc." For instance, Lechert et al. Stud. Surf. Sci. Catal., 84, 147 (1994) distinguishes between crystalline and amorphous gel forms of nucleating agents for type Y zeolites seeds. For the purposed of presenting the art of the present invention, however, we refer to both forms of these zeolite nucleating reagents as "zeolite seeds" or simply "seeds" whether they are sub-micrometer crystals or amorphous nanoclusters.

Zeolite seeds are formed by aging mixtures of silicate anions and aluminate anions under conditions of basic pH and, normally, elevated temperatures in the presence of specific inorganic and organic cations. The cations are selected so that they act. as "templates" or, more precisely, as structure directors in forming the seeds. For example, the use of inorganic cations to form seeds of zeolite Y, more precisely the seeds of faujasitic zeolites, has been disclosed by Robson ACS Sym. Ser., 398,436 (1989), by Vaughan et al, U.S. Pat. No. 4,178,352 (1979), Lechert et al, Stud. Sur. Sci. Catal., 84, 147 (1994), and by U.S. Pat. Nos. 3,574,538 and 3,808,326 to McDaniel et al, U.S. Pat. No. 3,671,191 to Maher et al. and U.S. Pat. No. 3,789,107 to Elliott. The. use of organic cations to form seeds of many different families of zeolites have been described by Lok et al. Zeolites, 3, 282 (1983); J. N. Watson et al. J. Chem. Soc., Faraday Trans. (94) 2181 (1998); P. P. E. A. deMoor, et al. Chem. Mater. (11) 36 (1999); P. P. E. A. de Moor, et al. J. Phys. Chem. B (103) 1639 (1999) and S. I. Zones et al., Microporous Mesoporous. Mater. 21, 199(1998).

The structures of amorphous nanoclustered seeds is unknown, but it is presumed that the nanoclusters contain linkages of $SiO_4$ and $AlO_4$ tetrahedra that resemble the secondary building blocks found in crystalline zeolites. These secondary building blocks may contain rings of a specific number of space filling oxygen atoms that bridge the tetrahedrally coordinated silicon and aluminum centers, such as single and double 4-rings, 5-rings, 6-rings, and the like. Whatever the structure or connectivity of the $SiO_4$ and $AlO_4$ units in nanoclustered aluminosilicate seeds may be, they are powerful structure-directing reagents in the nucleation of zeolite phases. The nanoclusters may be regarded as being "proto-zeolitic" by bearing a structure or tetrahedral building block connectivity that readily promotes zeolite crystallization. The art of the present invention discloses that these same protozeolitic seeds are preferred precursors for the supramolecular assembly of highly stable mesostructured aluminosilicate molecular sieves, even though the framework walls remain largely disordered in comparison to the atomically well-ordered framework walls of conventional zeolites. However, we do not exclude from the disclosed art the use of crystalline sub-micron zeolite seeds as precursors to the assembly of stable mesostructured aluminosilicate molecular sieves. Such small crystalline zeolite seeds can be transformed, at least in part, into stable framework wall-forming substructures under the conditions used to assemble a mesostructure. In addition, crystalline zeolite seeds may be admixed with amorphous nanoclustered seeds. Indeed, the residual crystalline zeolite seeds could even become embedded in the walls of the stabilized aluminosilicate mesostructures formed from the amorphous cluster fraction of the seed precursors. Mesostructures with such biphasic walls could have useful properties as catalysts for size dependent sequential chemical conversions, such as the cracking reactions involved in the refining of petroleum.

The structural order, acidity and steam stability of hexagonal aluminosilicate mesostructures all can be substantially improved through the assembly of nanoclustered precursors that normally nucleate the crystallization of microporous zeolites, particularly zeolites type Y and ZSM-5. These zeolite seeds are presumed to promote zeolite nucleation by adopting $AlO_4$ and $SiO_4$ tetrahedra connectivities that resemble the secondary structural elements in a crystalline zeolite. Assembling these same zeolite seeds into a mesostructure imparts acidity and hydrothermal stability that begin to approach zeolites, even though the framework walls remain in large part atomically disordered.

The assembly of hydrothermally stable aluminosilicate mesostructures from zeolite seeds according to the teachings of this invention is not limited to zeolite Y formed from inorganic cations or to ZSM-5 seeds formed from organic cations. Any zeolite seed composition can be used to form aluminosilicate mesostructures with a hydrothermal stability that is substantially improved in comparison to the same mesostructures prepared from conventional precursors. The literature discloses numerous examples of organic molecules and ions that organize (or "template") silicate and aluminate anions into nanoclustered units that seed the nucleation of crystalline zeolites (see, for example, B. M. Lok, et al. Zeolites (3) 282 (1983); R. E. Boyett, et al., Zeolites (17) 508 (1996); S. I. Zones, et al. Microporous Mesoporous Mater. (21) 199 (1998)). All of these zeolite seed compositions formed from organic templating agents are preferred precursors for the surfactant-directed supramolecular assembly of aluminosilicate mesostructures with enhanced hydrothermal stabilities.

The assembly of zeolite seeds, particularly amorphous nanoclustered seeds, into a mesoporous framework causes the framework aluminum to remain in large part tetrahedral as $AlO_4$ units even after calcination. Also, the siting of the aluminum is more like that found in a hydrothermally stable zeolite, as indicated by the aluminum nmr chemical shift. By doing so, up to 35 mol % aluminum can be easily incorporated into hexagonal and wormhole silicate frameworks, denoted $MSU-S_H$ and $MSU-S_W$, respectively. Up to 13% Al was incorporated into cubic silicate mesostructures, denoted $MSU-S_C$. More importantly, at least half and more typically more than 75% or even 90% of the aluminum sites remain tetrahedral after calcination at 540° C. Also the $^{27}Al$-NMR chemical shift, as well as the shape and width of the resonance, was very similar to that of microporous zeolite Y. These latter results indicate that the local structure of the aluminum is analogous to that found in one of the most stable and most widely used zeolites in the petrochemical industry. Thus, these new ultrastable mesostructures with pore sizes in the range 2.0 to 15 nm are very useful for many applications where zeolite Y and other zeolites cannot be used because of a limited pore size below 1.0 nm. In addition, the structures remain stable even after treatment in 20% steam at 800° C. for up to 5 hours, making them suitable for cracking or hydrocracking of high molecular weight petroleum fractions that cannot be processed by zeolite Y.

Hexagonal aluminosilicate mesostructures with Si/Al ratios in the range 80–2.0 have been assembled from aluminosilicate nanoclusters that normally nucleate the crystallization of zeolites type Y and ZSM-5. The aluminum content can be made very low in the case of ZSM-5 seeds increasing the Si/Al ratio to a value of 1000 and beyond. The calcined hexagonal mesostructures of this invention, denoted $^{27}Al$-$MSU$-$S_H$, are well-ordered, and structurally stable when exposed to 20% steam at 800° C. for 5 hours. Al MAS NMR chemical shifts indicate that, unlike mesostructures assembled from conventional precursors, the mean Al—O—Si angle is similar to the value found for many crystalline zeolites. The steam stability of 10% Al-$MSU$-$S_H$, together with an intrinsic acidity sufficient to crack cumene over the temperature range 300–450° C., suggests that nanoclustered zeolite seeds are promising precursors for the design of hydrothermally stable mesostructures for the acid-catalyzed processing of high molecular weight petroleum fractions that cannot be adequately refined over microporous zeolites.

Three structurally relevant properties embody the stable mesostructured aluminosilicate compositions of this invention from previously disclosed mesostructures. In the first general structural embodiment of the invention, the preferred compositions prepared from zeolite seeds have an experimentally observed $^{27}Al$ MAS NMR chemical shift in the range 57–65 ppm relative to an aqueous 1.0 M aluminum nitrate as an external chemical shift reference. This is the chemical shift range that is found for many crystalline zeolite, including zeolite Y and other faujasitic zeolites. All previously reported mesostructured aluminosilicates prepared from conventional silicate and aluminate precursors, including the original Al-MCM-41 compositions of Beck et al., exhibit a chemical shift of-53–56 ppm. Chemical shift values in the range of 57–65 ppm are indicative of a zeolite-like connectivity of the $SiO_4$ and the $AlO_4$ units that comprise the framework walls of the mesostructures, even though the framework walls are largely disordered. We postulate that the zeolitic connectivity of the said tetrahedral units contributes substantially to the improvement in the hydrothermal stability of these preferred mesostructured compositions.

In the second structural embodiment, the $^{27}Al$ MAS NMR chemical shifts of the preferred compositions fall in the range of previously disclosed mesostructured aluminosilicate compositions, namely, 53–56 ppm, but are distinguish by the presence of an infrared adsorption band in the frequency range 500–600 $cm^{-1}$ and by the retention of at least 80% of the initial framework mesopore volume is retained when the composition is exposed to boiling water for 5 hours or to 20% steam at 600° C. for 5 hours. The infrared band at 500–600 $cm^{-1}$ is indicative of the presence of zeolite-like secondary building blocks (e.g., 5-membered or 6-membered ring structures) in the amorphous framework walls.

In the third structural embodiment, the preferred aluminosilicate compositions of this invention are free of sodium exchange cations, exhibit a zeolite-like $^{27}Al$ MAS NMR chemical shift in the range 57 to 65 ppm, and contain between 0.01 and 10 wt % carbon embedded in the framework mesopores. The sodium ions in the as-made mesostructures are displaced by ion exchange reaction with an ammonium salt, most preferably ammonium nitrate, in aqueous solution in the presence of the structure directing surfactant in the framework mesopores This exchange reaction also displaces a substantial amount of surfactant from the mesopores. Subsequent to the ion exchange reaction with ammonium ions, the mesostructure is calcined in air at a temperature sufficient to remove the remaining surfactant and to convert the ammonium exchange ions to protons, most preferably at a temperature of 540° C. for a period of about 5 hours. This calcination procedure converts some of the remaining framework surfactant to carbon, presumably through cracking reactions of the surfactant in the acidic mesopores of the framework. The embedded carbon, which can amount to 0.01 to 10 wt % of the calcined mesostructure depending on calcination conditions, plays an important role in the hydrothermal stability of the mesostructures, presumably by reinforcing the framework against collapse under hydrothermal conditions.

In view of the importance of the $^{27}Al$ MAS NMR chemical shift measurements in characterizing the preferred compositions of this invention, we briefly describe the measurement of this diagnostic parameter. In magic angle spinning (MAS) nuclear magnetic resonance (NMR) spectroscopy experiment, the energy levels of the magnetic nucleus are split by the imposed magnetic field. Transitions between these energy levels are made to occur through the absorption of electromagnetic radiation in the radio frequency range, typically the megahertz range. The absorption of the electromagnetic radiation gives rise to a "resonance" line at a frequency that is energetically equivalent to the energy separation between the magnetic energy levels for the nucleus under investigation. The sample is spun at an angle to the imposed magnetic field (the so-called magnetic angle) to average-out dipolar interactions that can broaden the resonance lines and complicate the spectrum. Because the electrons surrounding the nucleus contribute to the magnetic field experienced by the nucleus, the resonance frequency is dependent on the chemical environment. Thus, the resonance frequency "shifts", depending on the chemical environment. These "chemical shifts" in the resonance frequency are recorded in "parts per million" (ppm) frequency units relative to the frequency of a reference compound with a known chemical environment and an arbitrarily assigned chemical shift of 0 ppm. The magnitude of the chemical shift is often used to deduce information on the chemical environment of the nucleus in the chemical compound being studied by MAS NMR.

In the case of quadrupolar $^{27}$Al nuclei, the splitting of the nuclear energy levels is determined by the nuclear magnetic spin quantum number 1=5/2. The observed MAS NMR spectrum is typically dominated by the (+½, -½) central transition. The experimentally observed chemical shift for the resonance line corresponding to this transition can be influenced by quadrupolar interactions of the nucleus with the electric field gradient at the nucleus. Generally speaking, the observed $^{27}$Al MAS NMR chemical shifts are too small and should be corrected for quadrupolar interactions to obtain the true values of the chemical shifts. However, if the electric field gradient at the nucleus is small, then the error in the observed resonance position for the (+½, -½) transition also is small (about 1 ppm or so in error) and no correction in the observed chemical shift is needed, especially if the differences in the chemical shifts being compared are much larger than the error caused by quadrupolar effects. This is typically the case for the $AlO_4$ tetrahedra in most zeolites and related aluminosilicates (see Lippmaa et al., J. Amer. Chem. Soc. 108 1730 (1986)), as well as for the $Al(H_2O)_6^{3+}$ cations that are used as the chemical shift reference in $^{27}$Al NMR spectroscopy. For this reason, the chemical shifts reported here and in the literature for aluminosilicate mesostructures are not corrected for quadrupolar effects.

EXAMPLE 1

In order to have a contrast example for our newly invented aluminosilicate mesoporous molecular sieves, we prepared a conventional (well-ordered) hexagonal MCM-41 aluminosilicate molecular sieve in which the overall Si/Al molar ratio was 49/1. This Example 1 sample is denoted 2% Al-MCM-41. The synthesis recipe was as follows: a solution containing the appropriate amounts of sodium aluminate ($NaAlO_2$) and sodium silicate solution was mixed, and then the required amount of $H_2SO_4$ acid was added under stirring to obtain a clear solution. Next, the required amount of cetyltrimethyl ammonium bromide in water was added and the mixture was stirred vigorous at ambient temperature for 30 minutes. The resultant mixture was aged without stirring in a teflon lined autoclave at 100° C. for 2 days. The product was recovered by filtration and thoroughly washing with deionized water. The molar composition for this particular synthesis was:

0.02 mole $NaAlO_2$
1.0 mole sodium silicate solution (27 wt %)
0.25 mole CTAB
0.28 mole $H_2SO_4$
130 mole $H_2O$ The initial solution concentrations were as follows:

$6.56 \times 10^{-4}$ mole sodium aluminate in 0.28 mole water
$3.28 \times 10^{-2}$ mole sodium silicate (27 wt %)
$8.20 \times 10^{-3}$ mole surfactant in 3.9 mole water
$9.18 \times 10^{-3}$ mole sulfuric acid in 0.08 mole water The sample after calcination at 650 degrees centigrade exhibited a BET surface area of 1037 m²/g, a total pore volume of 0.77 cc/g and an effective pore size of 33 Å as determined from the Horvath-Kawazoe model. The X-ray diffraction pattern exhibited three diffraction lines with d-spacings at 43.2, 24.9, and 21.6 Å and corresponding to the (100), (110) and (200) reflections, respectively, of a hexagonal mesostructure. The $^{27}$Al-NMR spectrum for this particular sample is shown in FIG. 1. In agreement with the findings reported by Corma and his coworkers, the MCM-41 aluminosilicate mesostructure prepared by this procedure has about ⅓ of the Al-sites in octahedral coordination and the remainder in tetrahedral coordination after calcination. The tetrahedral Al-sites exhibited a chemical shift at 53 ppm relative to 1.0 M aluminum nitrate solution, whereas the chemical shift for the aluminum in octahedral sites was 0 to 10 ppm. These chemical shifts are in agreement with the typical literature values (i.e. 53~56 ppm for tetrahedral aluminum and ~0.0 ppm for octahedral aluminum for a conventional Al-MCM-41.

EXAMPLE 2 TO 3

These two examples illustrate according to the teachings of the present invention the preparation of mesoporous aluminosilicates with hexagonal, cubic, and wormhole framework structures that are steam-stable in comparison to like mesostructure compositions obtained from conventional aluminosilicate precursors. The preferred aluminosilicate precursors of this invention contain nanosized aggregates in which the aluminum is in tetrahedral coordination and linked through bridging oxygen atoms to silicon tetrahedra that in are largely in $Q^4$ connectivity to other silicon tetrahedra. By $Q^4$ connectivity we mean that the $SiO_4$ tetrahedron is linked through bridging oxygens to four adjacent tetrahedra that are occupied by silicon and aluminum. These nanosized aluminosilicate precursors also are capable of promoting the crystallization of atomically ordered zeolite phases when mixed with suitable gels and aged under hydrothermal conditions. Owing to their ability to nucleate zeolitic phases, such as zeolites type Y (more precisely faujasitic zeolites) and ZSM-5 (more precisely MFI zeolites, these highly cross-linked precursors are often referred to as "zeolite seeds". Therefore, the aluminosilicate precursor of Example 2 is referred to here as a "type Y seeds" composition, because it is. known to promote the crystallization of Type Y zeolite. Likewise, the cross-linked aluminosilicate precursor of Example 3 is referred to here as "ZSM-5 seeds", because the precursor is known to nucleate the crystallization of ZSM-5 zeolite. However, in this example we use these zeolite seeds as precursors to mesoporous molecular sieve aluminosilicates with atomically disordered (amorphous) walls, but with a hexagonal, cubic or wormhole pore structure that sufficiently order on a mesoscopic length scale to exhibit correlation (Bragg) peaks in the powder X-ray diffraction pattern.

The type Y seeds composition of Example 2, which contained 10 mole % aluminum (Si/Al=9/1), was prepared in the following manner. A NaOH aqueous solution with 0.088 mole NaOH and 8.5 mole $H_2O$ was prepared and 0.10 mole $NaAlO_2$ was added to this NaOH solution under stirring until a clear solution formed. To this basic sodium aluminate solution was added 1.0 mole of sodium silicate from a 27 wt % sodium silicate solution under vigorous stirring until a homogeneous opalescence gel formed. To obtain the Y-seeds composition, the gel was sequentially aged at ambient temperature over night and then at 100° C. over night.

The 5% Al-ZSM-5-seeds composition corresponding to Example 3 was prepared from tetraethylorthosilicate (TEOS) as the silicon source and tetrapropylammonium hydroxide (TPAOH) as the template for ZSM-5 seed formation. TEOS (1.0 mole) was mixed with 0.22 mole of 1.0 M TPAOH to obtain a clear solution under mild heating. Then 0.05 mole aluminum sec-butoxide was added to obtain an opaque solution. The solution was diluted with 127 mole water and aged at 85° C. for 3 days to produce a clear ZSM-5 seeds solution.

Figure 2A:
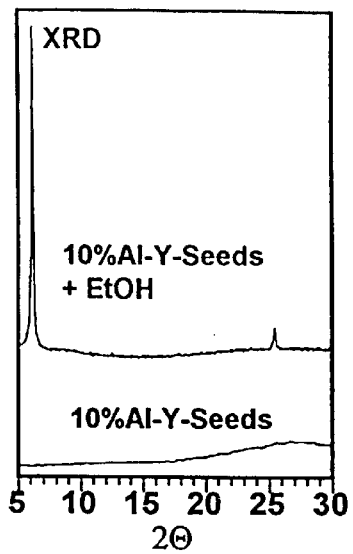
FIG. 2A provides the X-ray powder diffraction patterns for the solids formed by air drying the zeolite Y seeds (denoted 10% Al-Y-Seeds) and by precipitating the zeolite Y seeds through the addition of ethanol (denoted 10Al-Y-Seeds+EtOH)
Figure 2:
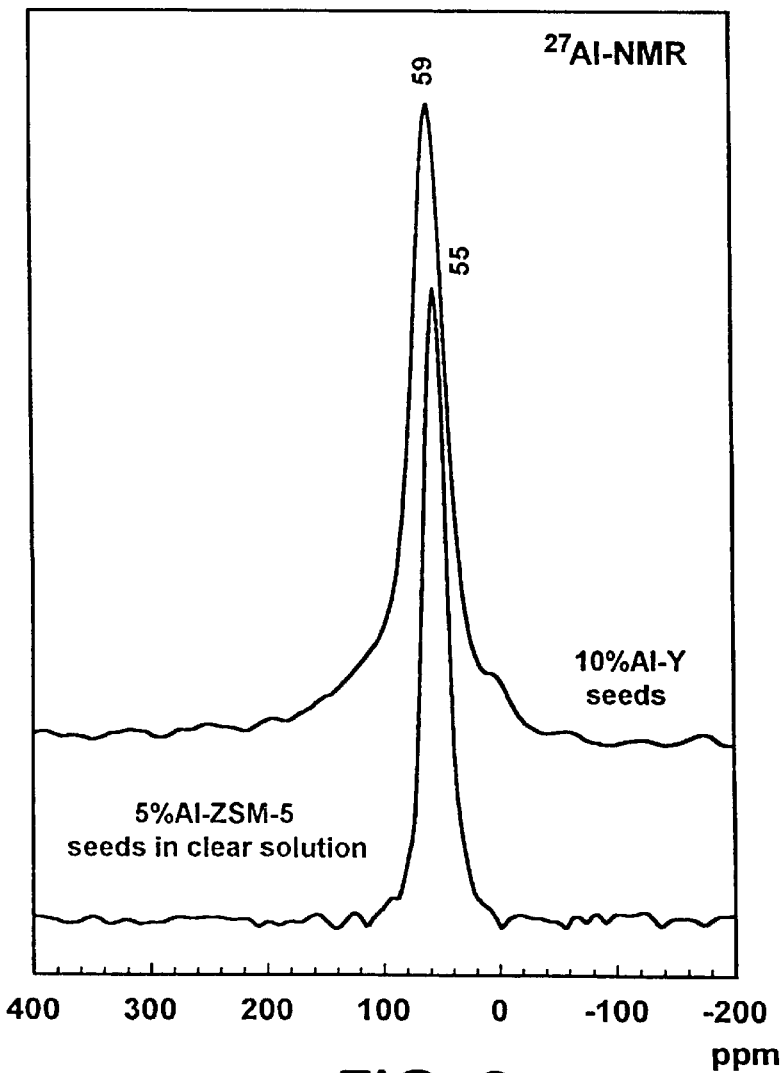
FIG. 2 provides the $^{27}$Al MAS NMR spectra for aluminosilicate nanoclusters that act as nucleation centers (seeds) for the nucleation of faujasitic zeolite Y (denoted 10% Al—Y) and the nucleation of MFI zeolite ZSM-5 (denoted 5% Al-ZSM-5).

27Al-MAS NMR spectra of the above Type Y and ZSM-5 seeds compositions were recorded on a Varian VRX 400S instrument in a zirconia rotor at spinning speeds of 2 kHz and 900 Hz, respectively. The spectra are shown in FIG. 2. FIG. 2A provides the X-ray diffraction pattern of the 10% Al-Y-seeds obtained by smearing the Y-seeds gel on a glass plate in the absence (bottom) or the presence of ethanol (top) to help promote the aggregation of the aluminosilicate precursor. The single $^{27}$Al NMR lines with chemical shifts of 55 and 59 ppm correspond to aluminum in a zeolite-like tetrahedral environment. In other words, the aluminosilicate species in the precursor compositions exhibit an NMR pattern consistent with the presence of nano-sized aluminosilicate clusters, as reported in the literature (White et al, *J. Chem. Soc., Faraday Trans.* 1998, 94, 2181; van Santen et al, *Chem. Mater.* 1999, 11, 36).

The following examples will illustrate the use of these nano-clustered zeolite seeds as precursors for the assembly of aluminosilicate mesostructures with hexagonal, cubic, and wormhole frameworks that are ultrastable under steaming conditions in comparison to mesoporous aluminosilicate molecular sieves prepared from conventional precursor solutions.

EXAMPLE 4 TO 6

These three examples were designed to illustrate the use of nanoclustered zeolite seeds according to art of the present invention for the preparation of mesoporous aluminosilicate molecular sieves with long range hexagonal order even at high tetrahedral aluminum concentrations in the framework. The hexagonal order is retained even after the mesostructures have been calcined to remove the surfactant. These mesostructures also exhibited a $^{27}$Al-NMR resonance with a chemical shift substantially greater than 56 ppm, indicating a more zeolitic connectivity of $SiO_4$ and $AlO_4$ units in the framework walls. This minimum chemical shift value for our new aluminate mesostructures is larger than the previously reported literature values for all known aluminated derivatives of silica mesostructures, regardless of the long range structural order of the mesostructure or the method used to form the aluminated derivatives. Moreover, the aluminum NMR chemical shifts for our new aluminosilicate mesostructures are comparable to the values typically observed for the siting of aluminum centers of crystalline zeolites, including steam stable HY zeolite.

This example illustrates how the art of the present invention overcomes the destructive effect of direct aluminum incorporation that is normally encountered in the assembly of a mesoporous aluminosilicate with long range hexagonal order. The three mesoporous aluminosilicate molecular sieves of examples 4, 5, and 6 have Al-loading of 2 mol %, 10 mol % and 20 mol %, and are denoted 2% Al-, 10% Al., And 20% Al-MSU-S$_H$, respectively. The molar compositions of the reaction mixtures used to prepare the steam-stable compositions of these examples were as follows:

0.02, 0.10, or 0.20 mole $NaAlO_2$, corresponding to the compositions of Examples 4, 5, and 6,respectively.
0.088 mole NaOH
1.0 mole sodium silicate
0.25 mole CTAB surfactant
0.62 mole $H_2SO_4$
130 mole $H_2O$ Gel-like type Y zeolite aluminosilicate seeds with the desired aluminum content were prepared according to the general method of Example 2 and diluted with 127 moles of water. To the diluted mixture, was added sequentially 0.044 mole $H_2SO_4$ and 0.20 mole CTAB under stirring at room temperature for 30 minutes. The resultant mixture was further acidified with 0.48 mole $H_2SO_4$ and aged at 100° C. for 20 h. The mixture then was acidified with 0.098 mole $H_2SO_4$ under vigorous stirring and aged at 100° C. again for 20 h to obtain the as-made aluminosilicate mesostructure. The as-made mesostructures were calcined at 540° C. for 7 h to remove the surfactant.

Figure 3:
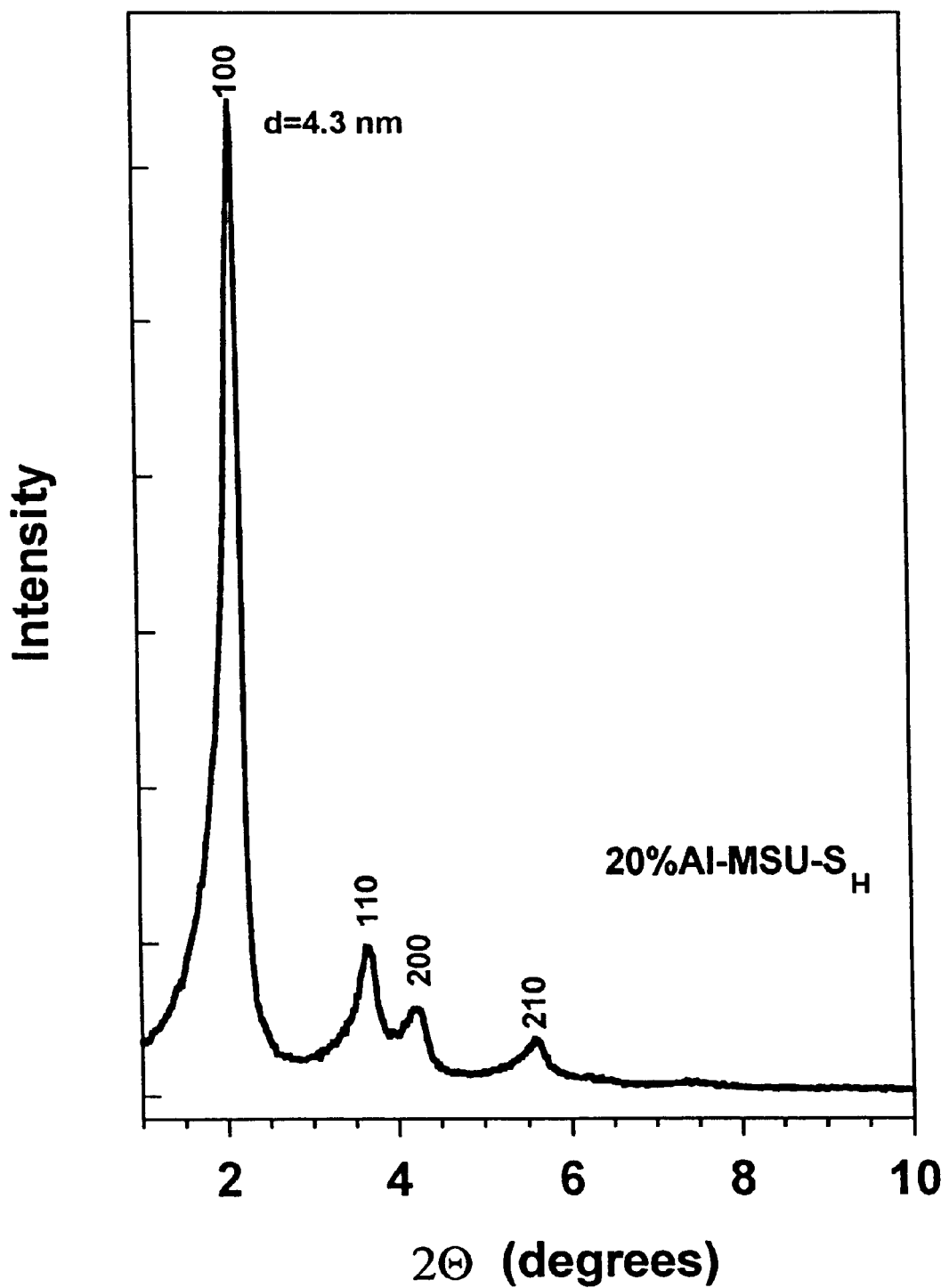
FIG. 3 is the XRD pattern for a 20% Al-MSU-S$_H$ hexagonal aluminosilicate mesostructure that has been calcined at 540° C.
Figure 4:
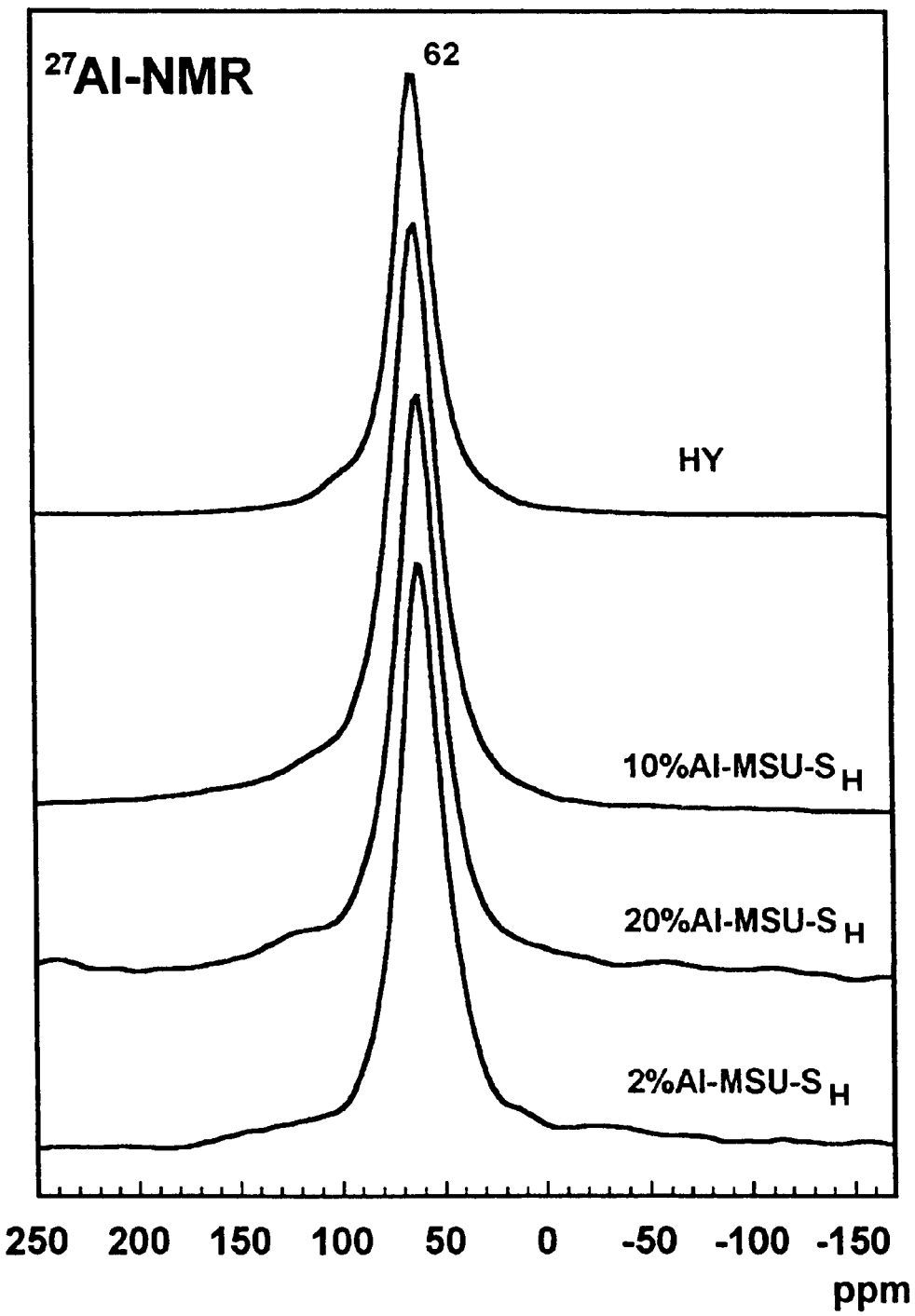
FIG. 4 provides the $^{27}$Al-MAS NMR spectra for calcined forms of Al-MSU-S$_H$ aluminosilicate mesostructures and for the proton form of zeolite Y (denoted HY). The chemical shift value of 62 ppm is indicative of tetrahedral $AlO_4$ centers with a zeolite-like connectivity to $SiO_4$ centers. No octahedral $AlO_6$ centers with a chemical shift near 0 ppm are indicated.

FIG. 3 shows the powder X-ray diffraction patterns for the calcined form of 20% Al-MSU-S$_H$. The four well-expressed reflections were indexed to the (100), (110), (200) and (210) reflections of a hexagonal mesophase. The calcined 2% Al- and 10% Al-MSU-S$_H$ mesostructures exhibited equivalent diffraction patterns. Equally important, each of calcined mesostructures exhibited a $^{27}$Al MAS NMR chemical shift at about ~62 ppm which is comparable to the shift of HY zeolites (FIG. 4). The BET surface area (m²/g) and pore volumes (cc/g) of the mesostructures prepared in Example 4 to 6 were 1037 and 0.80, 978 and 0.70 and 599 and 0.51, respectively. In each case, the average Hovarth-Kawazoe pore size determined from the nitrogen adsorption isotherm was about 33 Å.

EXAMPLE 7

This example illustrates that our new aluminosilicate mesoporous molecular sieves, as prepared according to Examples 4 to 6, is not limited to cetyltrimethylammonium ions as the structure director and that they can be formed using other quaternary ammonium ion surfactants, as well. In this example, tetradecyltrimethylammonium bromide (TTAB) in place of CTAB as the structure director. A reaction mixture containing 0.25 mole TTAB as the surfactant structure director and a 20 mol % Al type Y zeolite aluminosilicate precursor was prepared and processed in the same way as described in Examples 4 to 6. The resultant calcined-product exhibited a well-expressed hexagonal X-ray diffraction pattern with a basal spacing of 37.0, 21.3, 18.5 and 14.0 Å, corresponding to the (100), (110), (200) and (210) reflections of a hexagonal mesostructure, respectively. The magic angle spinning $^{27}$Al-NMR spectrum for the calcined sample exhibited a resonance with a chemical shift of 62 ppm.

EXAMPLE 8 TO 10

These two examples were designed to demonstrate the art of the present invention for the preparation of our new aluminosilicate mesostructures with long range cubic order, which we denote as Al-MSU-S$_C$. These cubic compositions also exhibit tetrahedral $^{27}$Al-NMR resonances at chemical shifts greater than 56 ppm and similar to the chemical shift of HY zeolite. Two cubic mesoporous aluminosilicate molecular sieves with Al contents of 2 mol %, and 10 mol % were prepared corresponding to examples 8 and 9, respectively.

To obtain the said cubic mesostructures, gel-like zeolite type Y aluminosilicate seed precursors with the appropriate Al content were obtained according to Example 2 and diluted with 127 mole water. For each mole of silicon used in the reaction mixture, the diluted gel was first treated with 0.044 mole H$_2$SO$_4$ to lower the pH. Then 0.12 mole CTAB and 3.0 mole ethanol was sequentially added under vigorous stirring at ambient temperature. After being stirred for 40 minutes the pH of the reaction mixture was reduced with the addition of 0.14 mole H$_2$SO$_4$. The resulting mixture was transferred to a Teflon-lined autoclave and aged at 150° C. for 15 h. The as-made products were recovered by filtration, air-dried and then calcined at 540° C. for 7 h to remove the surfactant.

Figure 5:
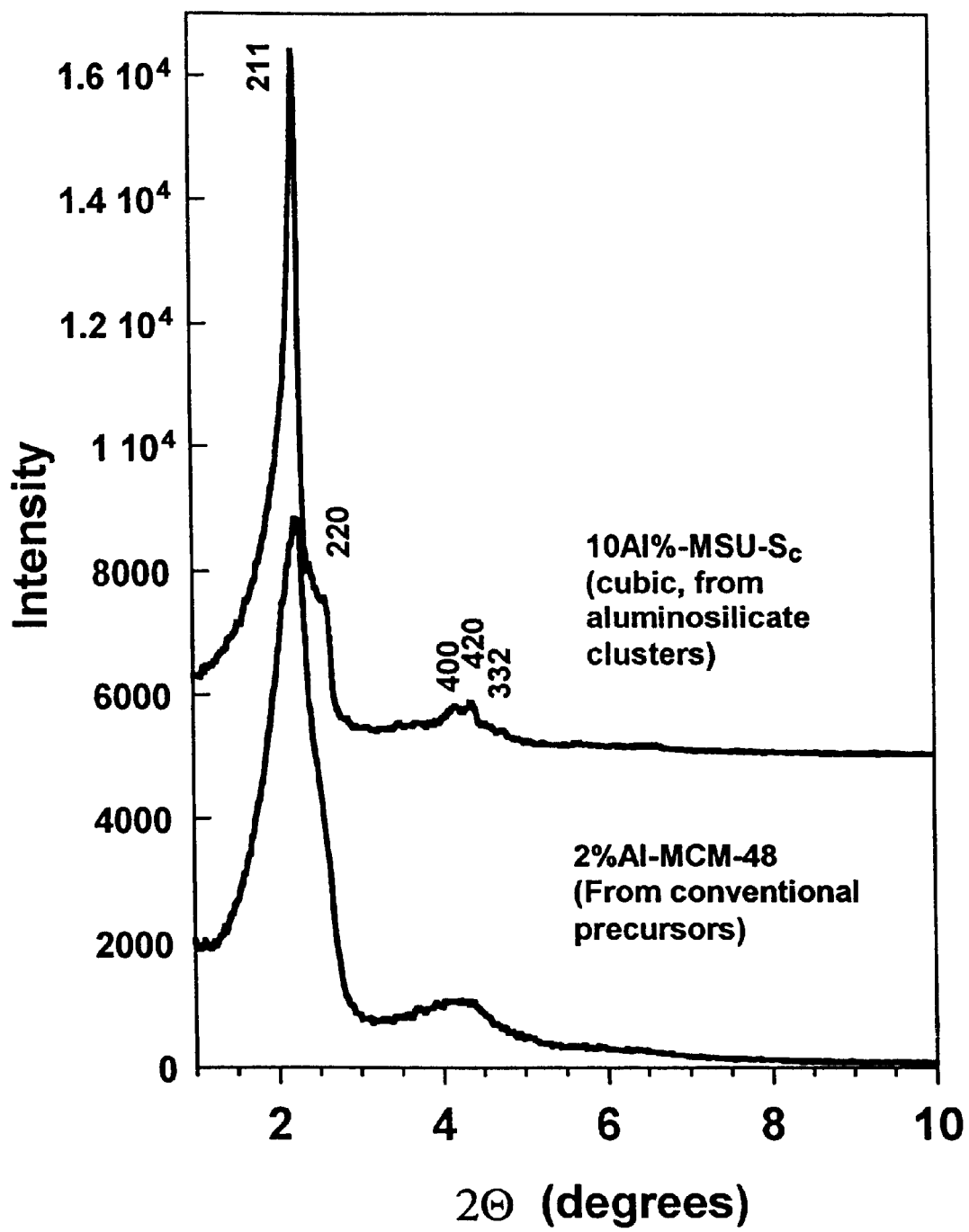
FIG. 5 provides the XRD patterns of a calcined cubic 10% Al-MSU-S$_C$ aluminosilicate mesostructure assembled from nanoclustered zeolite Y seeds and a calcined cubic 2% Al-MCM-48 prepared from conventional aluminate and silicate precursors.

In FIG. 5, the top diffraction pattern is for the calcined 10% Al-MSU-S$_C$ sample prepared from type Y zeolite seeds as described in Example 9. The bottom diffraction pattern is for 2% Al-MCM-48 as a contrast sample (Example 10). This contrast sample was prepared from conventional precursors by mixing diluted sodium silicate (1.0 mole) and sodium aluminate (0.02 mole) and NaOH (0.088 mole) solutions to obtain a clear solution and then reducing the pH immediately with 0.18 mole H$_2$SO$_4$. Then, 0.12 mole CTAB and 3 mole ethanol per mole of silicon was sequentially added under vigorously stirring at ambient temperature before transferring the reaction mixture to a Teflon-lined autoclave to age at 150° C. for 15 h. The product was then washed and calcined at 540° C. to remove the surfactant. This same procedure afforded a well-ordered cubic MCM-48-like silica when the aluminum was omitted from the reaction mixture.

It is clear from the XRD pattern for the calcined 10% Al-MSU-S$_C$ mesostructure in FIG. 5 that a well ordered cubic mesoporous aluminosilicate molecular sieves was obtained from type Y zeolite seeds as the inorganic precursor. In contrast, FIG. 5 also shows that the calcined 2% Al-MCM-48 mesostructure prepared from conventional sodium aluminate, sodium silicate precursors and surfactant is disordered as judged from the broad low angle x-ray reflections.

Figure 6:
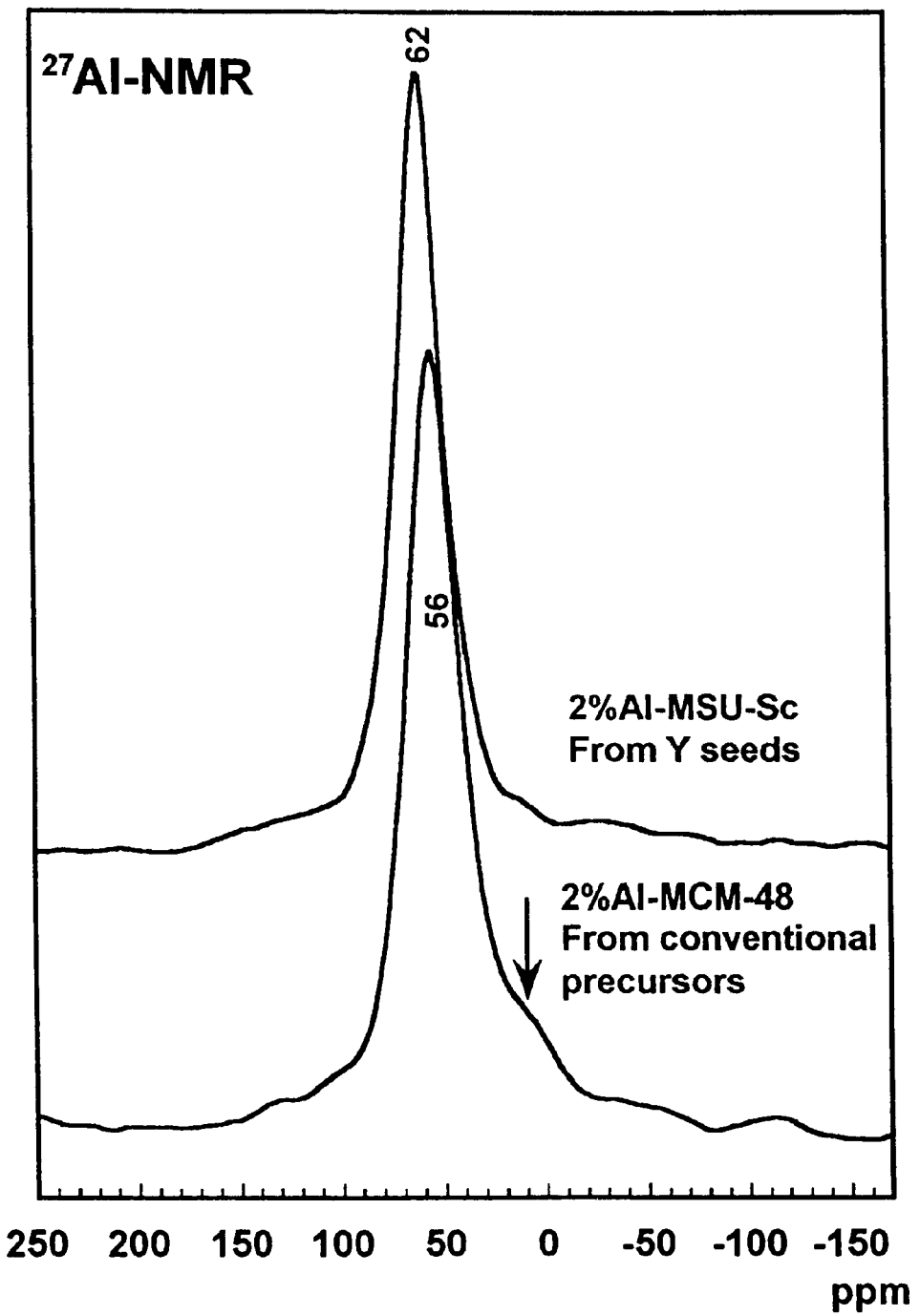
FIG. 6 provides the 27Al MAS NMR spectra for 2% Al-MSU-S$_C$ prepared from zeolite Y seeds and 2% Al-MCM-41 prepared from conventional precursors. The arrow points to the resonance line near 0 ppm indicative of $AlO_6$ centers.

The $^{27}$Al-NMR spectra of 2% Al-MSU-S$_C$ from Example 8 and 2% Al-MCM-48 from Example 10 are shown in FIG. 6. The zeolite-like resonance at a chemical shift of 62 ppm clearly indicates the exclusive presence of tetrahedral Al-sites for the cubic 2% Al-MSU-S$_C$. An analogous result was obtained for the cubic 10%-MSU-S$_C$ mesostructure prepared in Example 9. However, the resonance for the tetrahedra aluminum in 2% Al-MCM-48 occurs at a chemical shift of 56 ppm. In addition, this latter mesostructure exhibits a resonance (indicated by the arrow) at 0 ppm corresponding to octahedral Al-sites. Consequently, we can conclude that pre-formation of aluminosilicate nanocluster indeed improves the long range order of cubic mesostructures as well as the Al-sitting in these mesoporous molecular sieves. The BET surface area (and pore volume) measured from N$_2$ adsorption isotherms for the MSU-S$_C$ samples prepared from Example 8 and 9 were 976 (0.70) and 599 m$^2$/g (0.51 cc/g). The effective pore size calculated from the Hovarth-Kawazoe model was 26 Å for both samples.

EXAMPLE 11 AND 12

These two examples were designed to illustrate the versatility of using pre-formed aluminosilicate nanoclusters to assemble wormhole-like mesoporous molecular sieves, denoted MSU-S$_W$, with zeolite-like tetrahedral Al-sites (as judged from $^{27}$Al NMR chemical shifts), as well as textural porosity that is useful for catalysis.

Example 11 made use of preformed Zeolite Y (faujasitic) seeds as described in Example 2. Example 12 made use of preformed ZSM-5 seeds as described in Example 3. In Example 11 a 10% Al-containing seeds composition was prepared as described in Example 2 and then 0.073 mole CTAB was added per mole of Si under vigorously stirring at ambient temperature for 30 minutes. The resultant mixture was aged at 100° C. for 2 days and the product was filtered, washed and air-dried. For Example 12, a clear 5% Al-ZSM-5 seeds solution obtained as described in Example 3 and then 0.073 mole CTAB per mole silica was added at ambient temperature under stirring. The resultant mixture was aged at 100° C. for 2 days and the product was recovered by filtration, washed and air-dried. The surfactant in the samples obtained from Examples 11 and 12 was removed from the framework pores by calcination at 540° C. in air for 7 h.

Figure 7A:
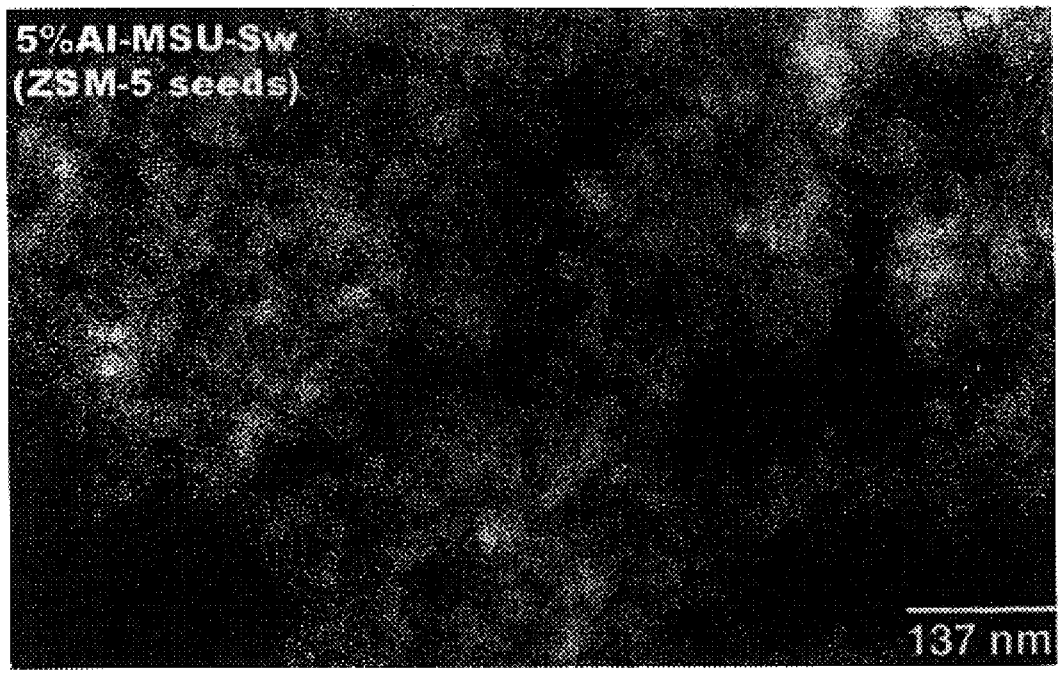
FIGS. 7A and 7B provide transmission electron micrographs for 5% Al-MSU-S$_W$ and 10% Al-MSU-S$_W$ wormhole structures assembled from zeolite ZSM-5 and zeolite Y seeds, respectively.
Figure 7B:
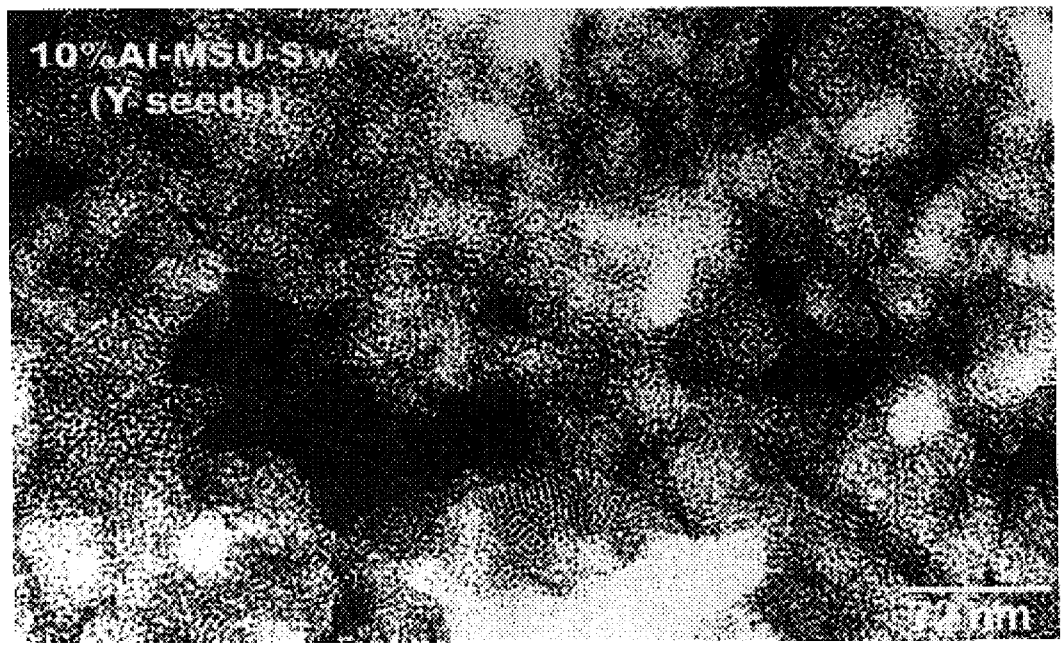
Figure 8:
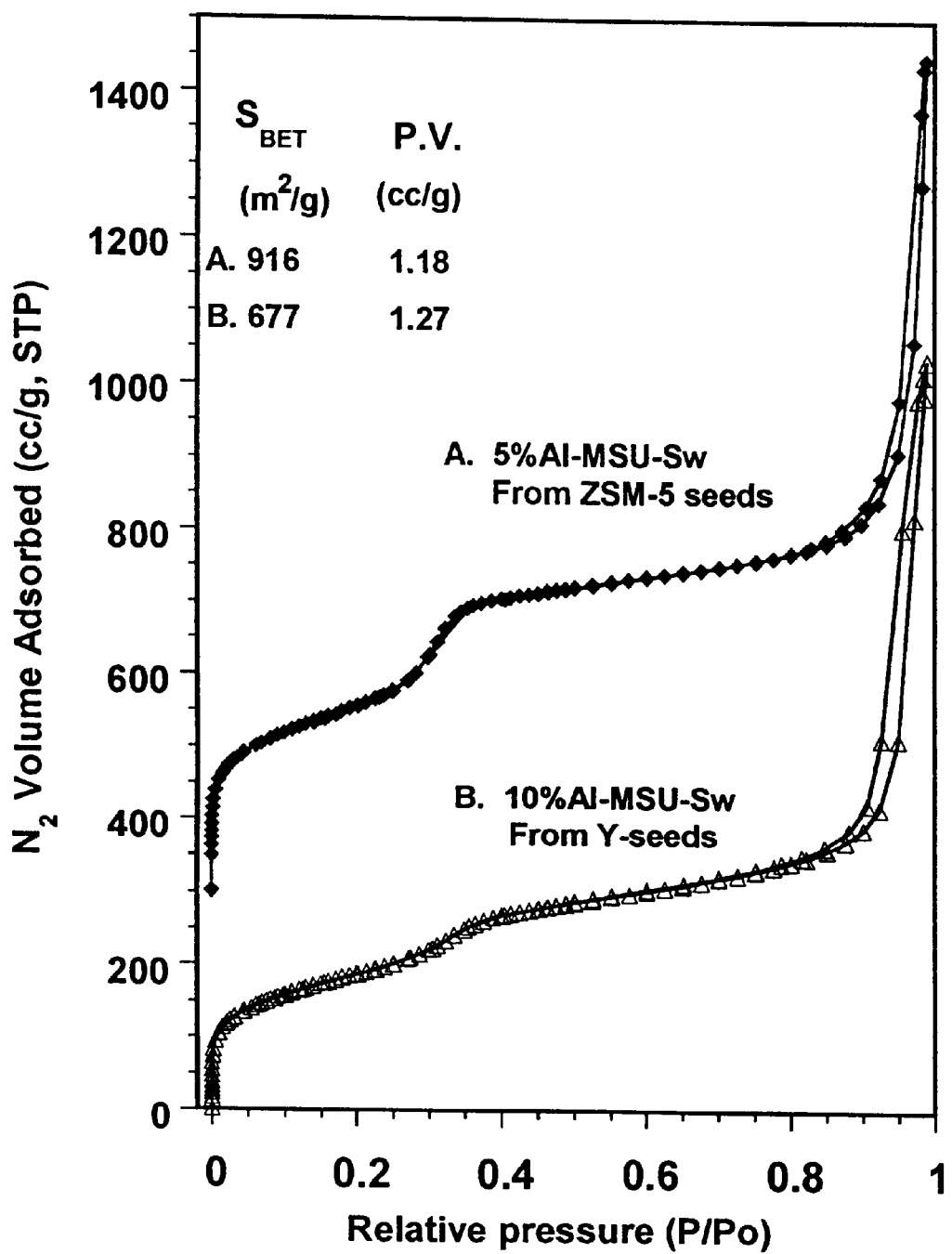
FIG. 8 provides the nitrogen adsorption/desorption isotherms for 5% Al-MSU-S$_W$ and 10% Al-MSU-S$_W$ wormhole structures assembled from zeolite ZSM-5 and zeolite Y seeds, respectively. The insert provides the BET surface areas ($S_{BET}$) and pore volumes (P.V.) derived from the isotherms.
Figure 9:
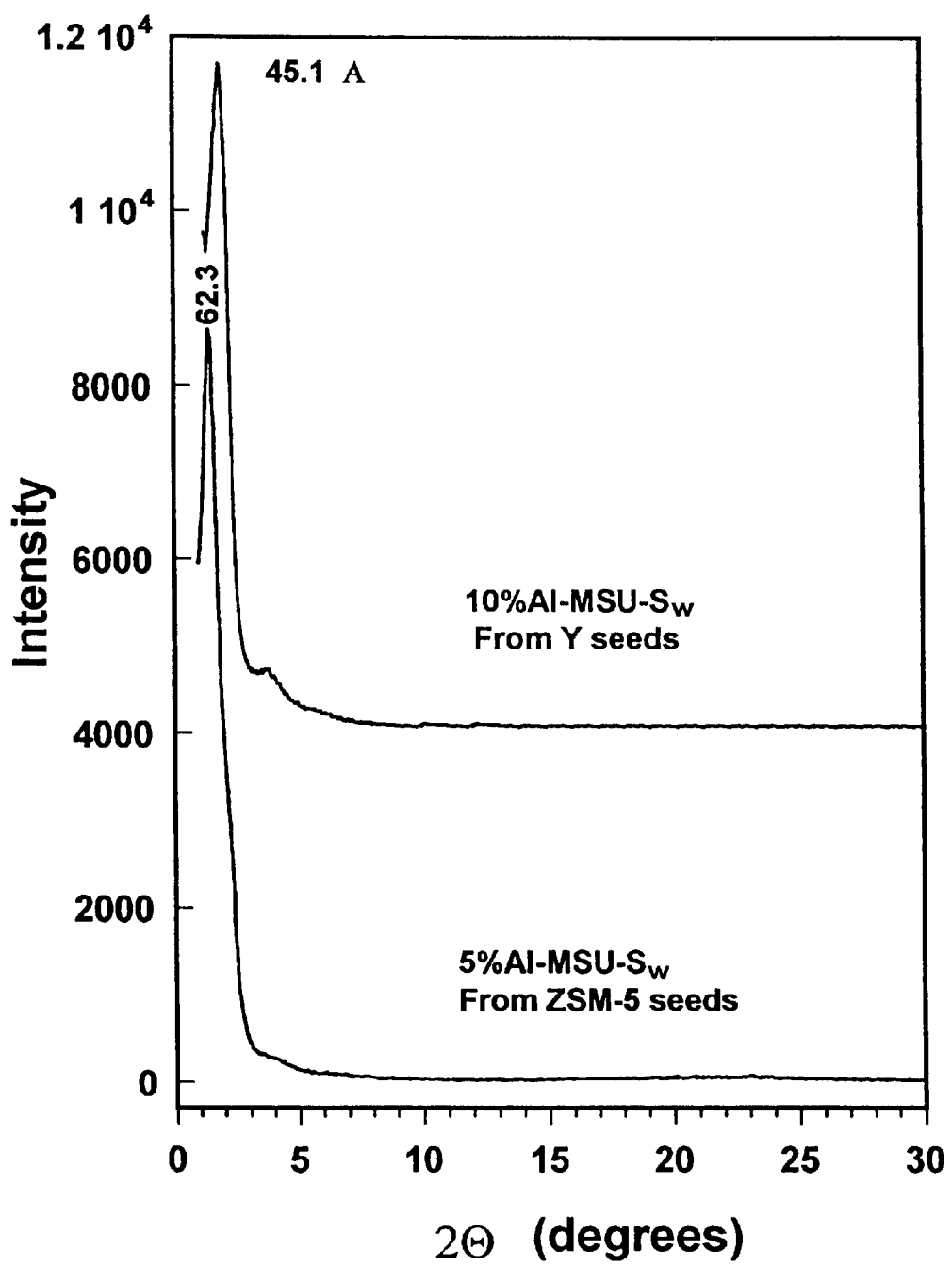
FIG. 9 provides the XRD patterns for mesoporous aluminosilicates 10% Al-MSU-S$_W$ (assembled from zeolite Y seeds) and 5% Al-MSU-S$_W$ (assembled from zeolite ZSM-5 seeds) with wormhole framework structures.

FIGS. 7A and 7B show the TEM images obtained for the MSU-S$_W$ samples prepared in examples 11 and 12. The images were recorded on a JEOL 100CX instrument with an electron beam accelerated at 120 kV using CeB$_6$ gun. The samples were dusted onto a copper-grid to obtain the images. Both wormhole-like framework pore channels and intraparticle textural mesopores are observed for both samples. The textural pores result from the intergrowth of nanoscale framework domains of primary particles. In agreement with the textural porosity evident in the TEM images, the N$_2$ adsorption-desorption isotherms, as shown in FIG. 8 for the calcined materials, exhibit a large amount of textural porosity as evidenced by the hysteresis loop at partial pressures above 0.80. The filling of the framework wormhole pores is indicated by the step in the adsorption isotherms at partial pressures between 0.25 and 0.45. In agreement with a wormhole framework structure, the X-ray diffraction patterns (FIG. 9) for the calcined aluminosilicate mesoporous molecular sieves of examples 11 and 12 contain a single intense X-ray diffraction line corresponding to the correlation length between the wormhole pores and a weak higher order refectin at higher scattering angle. Also, the $^{27}$Al-NMR spectra for these two wormhole mesostructures exhibited a zeolitic chemical shift at ~61 ppm, in accord with the shifts observed for the samples prepared in Example 4 to 6.

EXAMPLE 13

The purpose for this example was to show that the aluminosilicate mesostructures prepared from nanoclustered zeolite seeds according to the present art are capable of surviving exposure to steam at 800° C., at least when the structures are free of sodium ions and surfactant.

Samples of 10% Al-MSU-S and 20% Al-MSU-S$_H$, were prepared from nanoclustered zeolite Y type seeds according to the general procedure described in Examples 4–6. One-gram quantities of each as-made sample were separately treated with 100 ml 0.1 M NH$_4$NO$_3$ aqueous solution at 100° C. for overnight. The treated samples were recovered by filtration and calcined at 540° C. in air for 7 hours to remove the surfactant in the mesopores. These calcined samples were used for steam stability testing. Each sample was steamed at 800° C. for 5 hours in the a stream of 20 vol % steam-containing N$_2$. Then the X-ray diffraction patterns and nitrogen adsorption isotherms were used to investigate the retention of a mesoporous structure after steaming.

Figure 10:
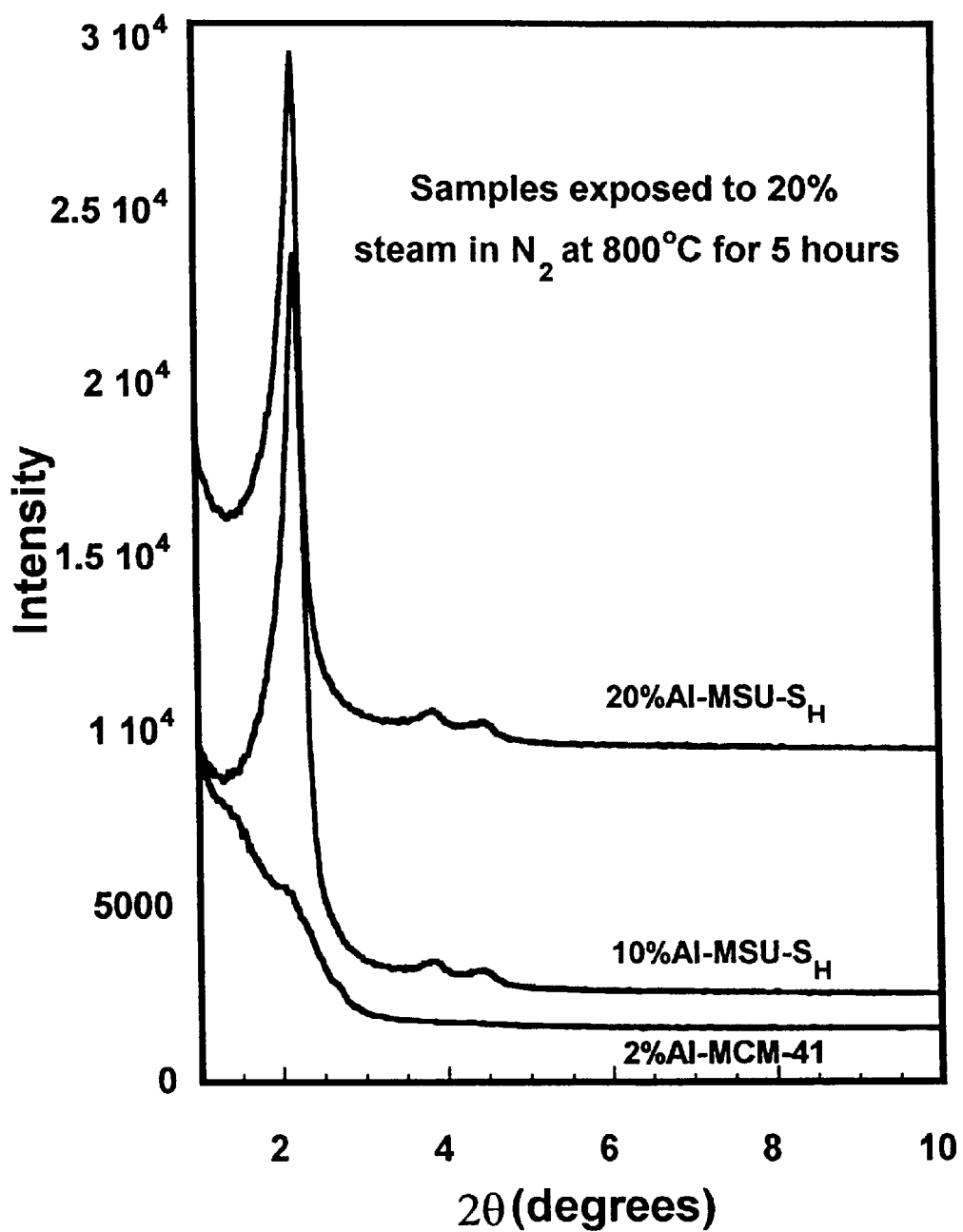
FIG. 10 provides the XRD patterns for 20% Al⁻ MSU-S$_H$, 10% Al-MSU-S$_H$ and 2% Al-MCM-41 aluminosilicate mesostructures after having been exposed to 20 vol % steam at 800° C. for 5 hours.

As shown in FIG. 10, it is obvious that the aluminosilicate mesostructures formed from preformed aluminosilicate nanoclusters retained their hexagonal structural integrity entirely, but the conventional MCM-41 like hexagonal mesostructure collapsed after steaming treatment at 800° C. for 5 hours. This is in agreement with what has been reported previously by Ryoo and his co-workers (Ryoo, J. Phys. Chem. 1995, 99, 16742) regarding the stability of MCM-41 prepared from conventional precursors.

Chemical analysis of the calcined samples before steaming indicated the presence of about 0.8% carbon. Samples calcined for periods longer or shorter periods than eight hours contained quantities of carbon lower than or greater than the 0.8 wt % value, respectively. Also, the degree to which the samples retained a hexagonal X-ray pattern and a framework mesoporosity after steaming generally paralleled the carbon content. Thus, we conclude that the framework embedded carbon, as well as the zeolite-like connectivity of the framework walls contributes to the steam stability of these materials.

EXAMPLE 14

The purpose of this example was to prepare a so-called ultrastable Al-MCM-41 sample according to the preparation art of R. Mokaya, as described in *Angew.Chem.Int. Ed.* 1999, 38 No. 19, 2930. A 1.0 g calcined sample of a "secondary" MCM-41 silica was prepared according to the methodology of Mokaya (see below). To this secondary silica was add 50 ml of aluminum chlorohydrate (ACH) solution (0.48 M with respect to Al) and the mixture was stirred at 80° C. for 2 h. The resulting solid was collected by filtration and washed with 100 ml distilled water until it was free of Cl⁻ ions, dried at room temperature, and calcined in air at 550° C. for 4 h.

In accord with the teachings of Mokaya, in order to prepare a "secondary" MCM-41 silica, we first prepared a "primary" MCM-41 silica. To obtain the primary MCM-41 silica, 2.0 g of fumed silica was added to a solution containing 3.0 g cetyltrimethylammonium bromide (CTAB) and 0.610 g tetramethyl-ammonium hydroxide (TMAOH) in 24 g $H_2O$ at 35° C. under stirring for 1 h. After further stirring for 1 h, the resulting synthetic gel of molar composition $1.SiO_2$; 0.25 CTAB: 0.2TMAOH; $40H_2O$ was left to age 20 h at room temperature then the mixture was transferred to a Teflon-lined autoclave and heated at 150° C. for 48 h. The solid product was obtained by filtration, washed with distilled water, dried in air at room temperature and calcined at 550° C. for 8 h. The "secondary" MCM-41 silica was then prepared from the primary MCM-41 silica. To prepare the secondary MCM-41, a synthesis gel of same molar ratio was prepared, except that the primary calcined MCM-41 was used as silica source instead of fumed silica. The synthetic procedures were identical to the described for the primary synthesis.

The procedure for the steam stability test was as follows: 0.2 g of ultra stable MCM-41 was put into a Y-shaped quartz tube reactor and a stream of 20 vol % steam in $N_2$ was introduced at 800° C. for 5 hours. The 20% water steam in $N_2$ was generated using a saturator. The X-ray diffraction patterns and $N_2$-sorption and desorption isotherms were used to evaluate the residual structure after steaming.

Figure 11C:
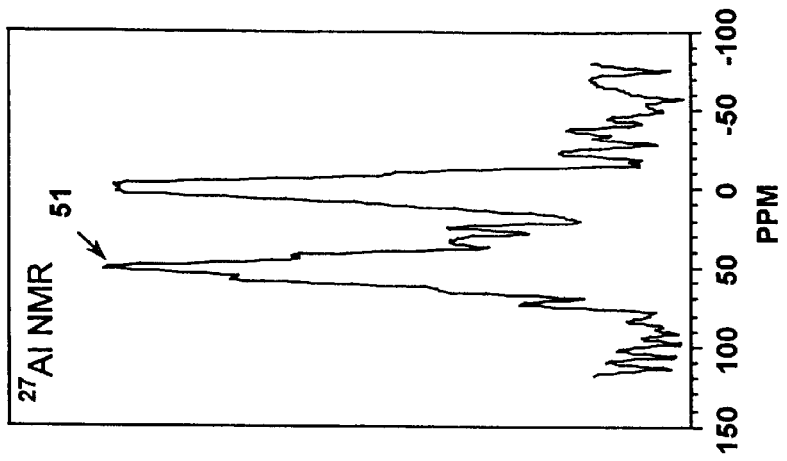
FIGS. 11A, 11B and 11C provide the XRD patterns (11A), and nitrogen adsorption/desorption isotherms (11B) for a freshly calcined ultrastable Al MCM-41 aluminosilicate prepared by grafting reaction of a secondary silica mesostructure with $Al_{13}$ oligocations according to the method of Mokaya (Angew. Chem. Int. Ed. 38 No. 19, 2930 (1999)) and for the same mesostructure after exposure to 20 vol % steam in nitrogen at 800° C. for 5 hours. Also, included in the figure is the $^{27}$Al MAS NMR spectrum (11C) for the sample after exposure to steam.
Figure 11B:
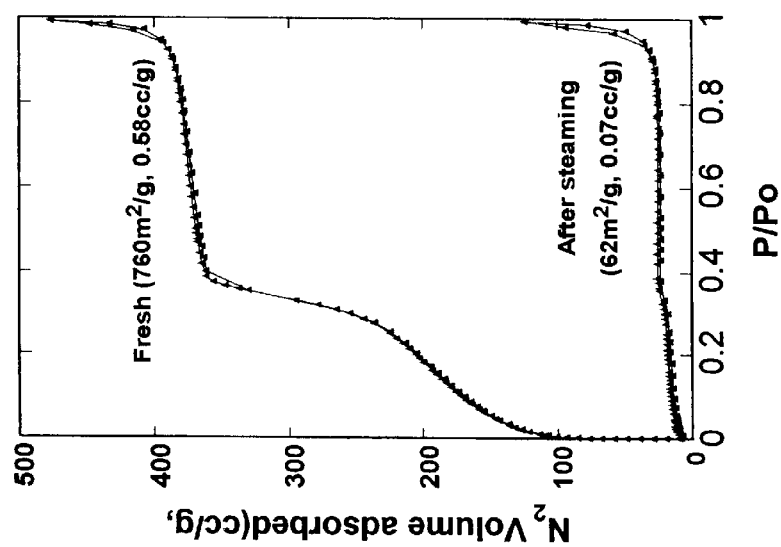
Figure 11A:
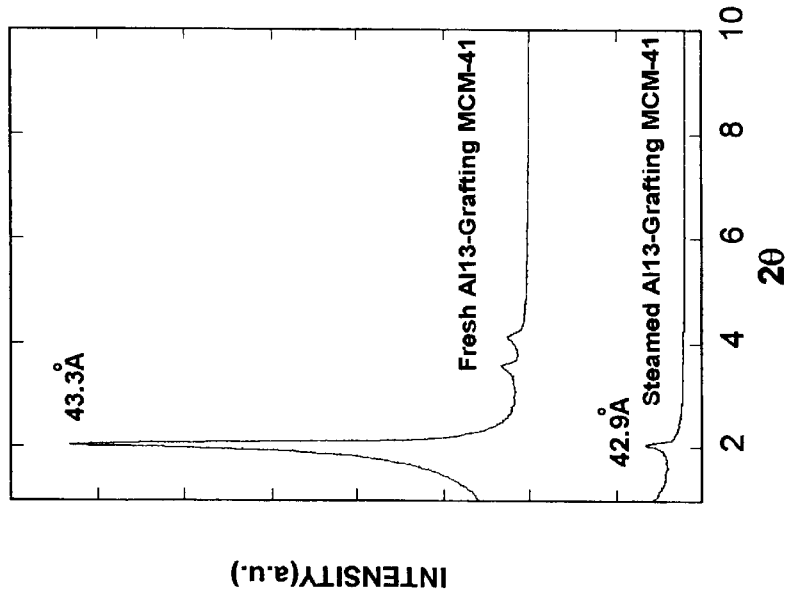

As shown by the X-ray and $N_2$ adsorption data in FIGS. 11A, 11B and 11C, the ultrastable MCM-41 of Mokaya underwent structural collapsed after the steaming treatment at 800° C. for 5 and the surface area was reduced by 92% to 62 m²/g by steaming. Also, the $^{27}$Al MAS NMR spectrum in FIG. 11 shows that only about half the aluminum is in tetrahedral environments (~51 ppm) and the other half is in octahedral environments (~0 ppm). We conclude that this material lacks the desired stability for many practical applications in acid catalysis, especially catalytic cracking.

EXAMPLE 15 AND 16

Example 15 describes the synthesis and properties of a typical hexagonal aluminosilicate mesostructure., !0% Al-MSU-S$_H$ (Si:Al=9:1), derived from seeds that normally nucleate the crystallization of faujasitic zeolite type Y. The procedure used here for forming the zeolite type Y seeds follows the general methodology described in the literature (Robson, H. ACS Symp. Ser. 398 436 (1989); and Lechert, L., et al., Stud. Surf. Sci. Catal. 84 147 (1994)).

Example 16 describes the preparation of a 10% Al-MCM-41 from convention silicate and aluminate precursors by eliminating the zeolite seeds-forming step used in the preparation of the 10% Al-MSU-S$_H$ in Example 15. We then compare on the basis of XRD and nitrogen adsorption properties the steam stabilities of these two mesostructures. In addition, we include in the comparison of steam stability the "ultrastable" Al-MCM-41 prepared as described in Example 14 using the method of Mokaya.

The 10% Al-MSU-S$_H$ of Example 15 was prepared as follows. First, 0.269 g $NaAlO_2$ was dissolved in a solution of 0.116 g of NaOH in 5.0 ml water to obtain a clear solution. To this solution was added 7.29 g of sodium silicate solution (27 wt % $SiO_2$, 14 wt % NaOH) under vigorous stirring to obtain a homogeneous mixture. To generate faujasitic type Y zeolite seeds, the resulting mixture was aged at room temperature overnight and then an additional 24 hour period at 100° C. under static conditions. The mixture of zeolite seeds was diluted with 75 ml of water to obtain a milky suspension. Concentrated sulfuric acid (0.142 g) was added to the seeds mixture, followed by the addition of 2.45 g of cetyltrimethylammonium bromide (CTAB) under vigorous stirring for 30 minutes. Then an additional 0.781 g of sulfuric acid was added and the mixture was allowed to age at 100° C. under static conditions overnight. Following this aging step additional increments of 0.156 g and 0.781 g of sulfuric acid were added and the mixture was again allowed to age at 100° C. overnight under static conditions to form the mesostructure. At this point the pH of the reaction mixture was about 9.0 The resulting 10% Al-MSU-S$_H$ product prepared from zeolite seed precursors was filtered, washed, and dried at ambient temperature in air. A 1.0-g quantity of the air-dried product was treated with 100 ml of 1.0M $NH_4NO_3$ at 100° C. overnight to displace sodium ions and about half of the surfactant from the mesopores, dried in air, and then calcined at 540° C. for 7 h to remove remaining surfactant and to convert charge-balancing ammonium ions to protons. Chemical analysis of the calcined product indicated a Si:Al molar ratio of 9:1, along with the presence of 0.80 wt % carbon. We attribute the formation of carbon to the cracking of surfactant in the very acidic mesopores of the zeolite-like framework of the hexagonal MSU-S$_H$ mesostructure during calcination.

The 10% Al-MCM-41 comparative sample of Example 16 was prepared as follows. A mixture of 0.269 g of $NaAlO_2$ and 7.29 g of sodium silicate (27 wt % $SiO_2$, 14 wt % NaOH) were stirred vigorously to form a homogeneous mixture and then 75 ml of water was added to form a milky suspension. To the milky suspension was added sequentially with stirring 0.142 g of concentrated sulfuric acid, 2.45 g of cetyltrimethylammonium bromide with vigorous stirring for 30 minutes, and 0.781 g concentrated sulfuric acid. The resulting mixture was allowed to age overnight at 100° C. under static conditions. The resulting 10% Al-MCM-41 mesostructure prepared from conventional aluminate and silicate precursors was filtered, and dried in air at ambient temperature. A 1.0-g quantity of the air-dried product was treated with 100 ml of 1.0M $NH_4NO_3$ at 100° C. overnight to displace sodium ions and some of the surfactant from the mesopores, dried in air, and then calcined at 540° C. for 7 h to remove remaining surfactant and to convert charge-balancing ammonium ions to protons. Chemical analysis indicated a Si/Al ratio of 9/1, but the presence of less than 0.04% carbon.

Figures 12A, 12B:
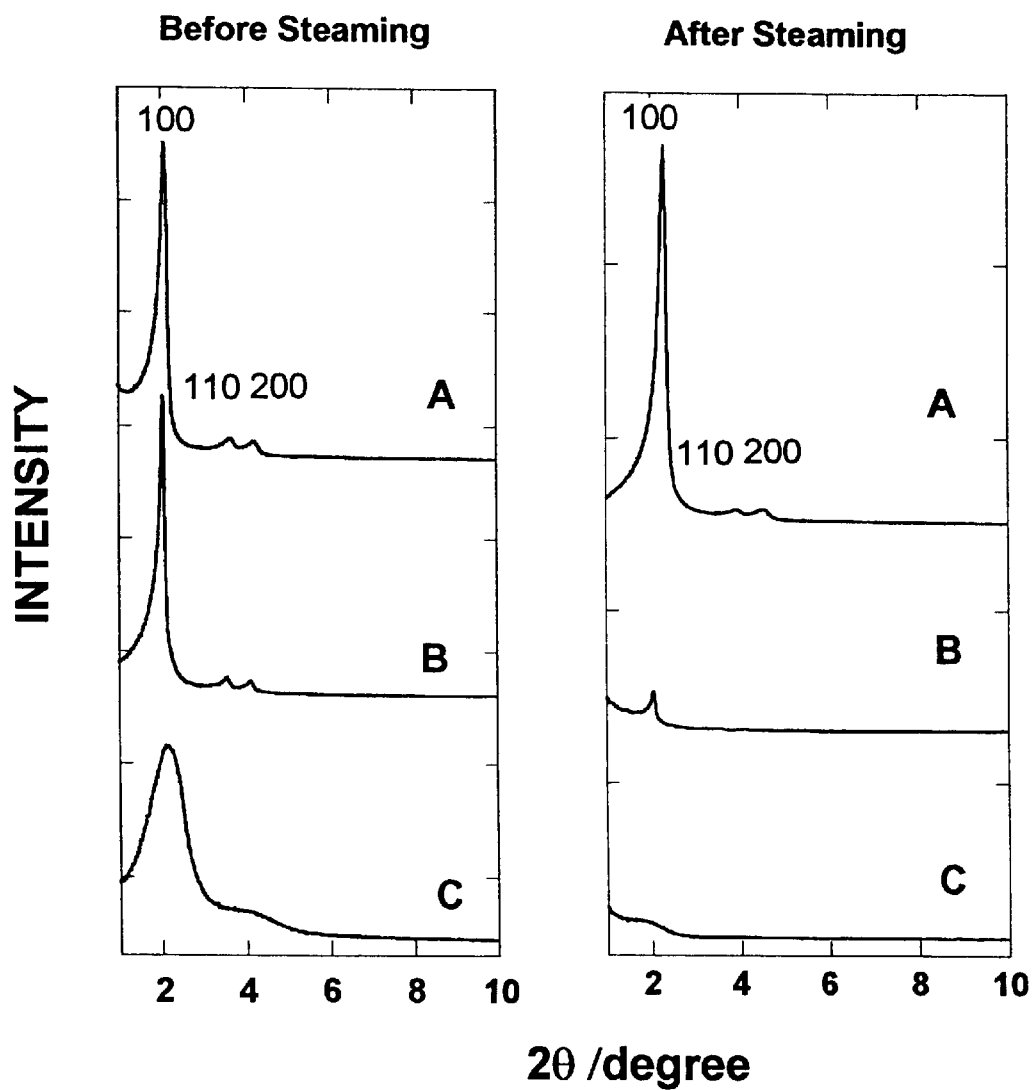
FIGS. 12A and 12B provide XRD patterns of calcined (540° C., 7 h) mesoporous aluminosilicate molecular sieves before (12A) and after (12B) exposure to 20 vol % steam in nitrogen at 800° C. for 5 h): (A) hexagonal 10% Al-MSU-S$_H$; prepared from zeolite Y seeds; (B) "ultrastable" hexagonal 14% Al-MCM-41 prepared by the grafting method of Mokaya (Angew. Chem. Int. Ed., 38 No. 19, 2930 (1999)); (C) disordered 10% Al-MCM-41 prepared by direct synthesis from conventional silicate and aluminate precursors. The intensity scale is the same for the samples before and after steaming. Hexagonal unit cell parameters are provided in Table 1.

FIGS. 12A and 12B illustrate the XRD patterns of calcined 10% Al-MSU-$S_H$ (Example 15) and 10% Al-MCM-41 (Example 16) before and after exposure to 20% (v/v) water vapor in $N_2$ at 800° C. for 5.0 h. Included in FIGS. 12A and 12B are the corresponding patterns for 14% Al-MCM-41 prepared as described in Example 14 using the very recently reported post-synthesis grafting reaction between a sodium-free MCM-41 silica and $Al_{13}$ oligocations (R. Mokaya, Angew. Chem. Int. Ed., 38, 2930 (1999)). This latter grafted form of Al-MCM-41 has been described as being "ultrastable" in comparison to all previously reported Al-MCM-41 derivatives. The XRD patterns of calcined 10% Al-MSU-$S_H$ and ultrastable 14% Al-MCM-41 prior to steaming show well expressed hkl diffraction lines indicative of a hexagonal mesostructure. The diffraction lines for 10% Al MCM-41, made by the direct synthesis route of Example 16, are substantially broadened. This broadening of the diffraction lines is indicative of the disorder that normally accompanies the direct assembly of Al-MCM-41 from conventional aluminate and silicate precursors, particularly when the intended level of silicon substitution by aluminum in the framework is greater than about 8 mole %.

Figures 13A, 13B:
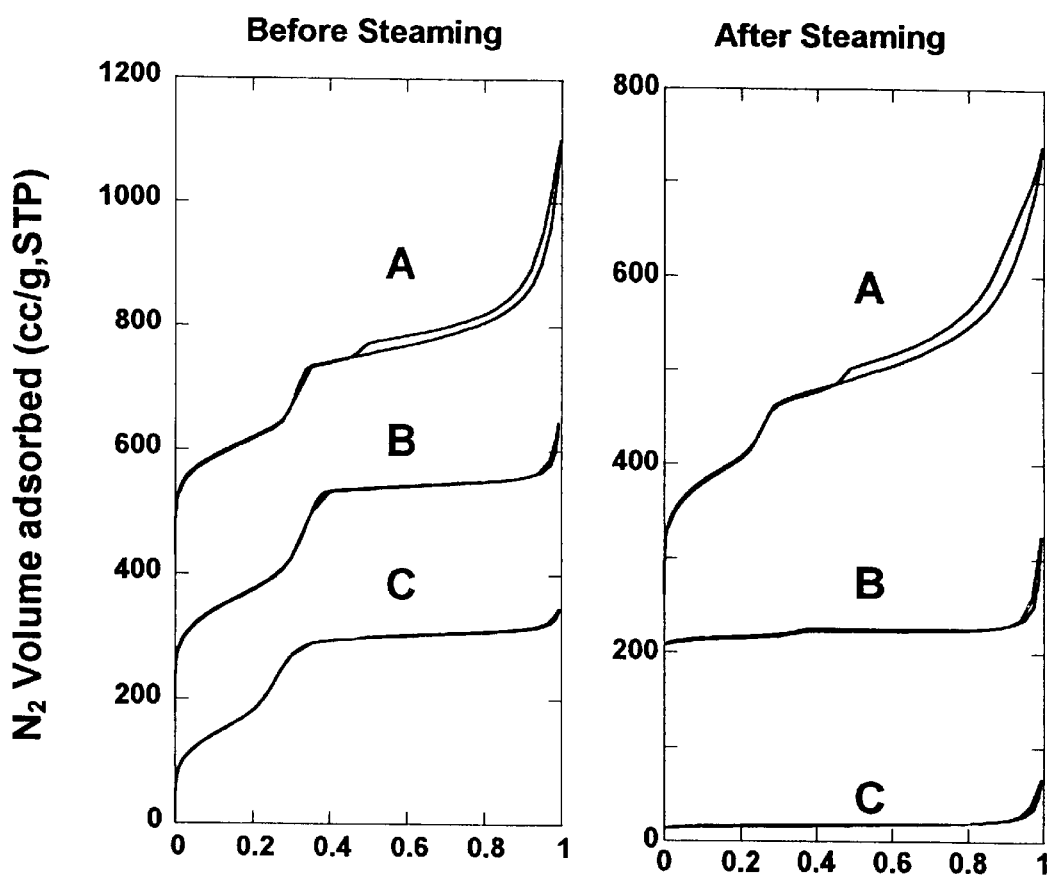
FIGS. 13A and 13B provide the $N_2$ adsorption/desorption isotherms for calcined (540° C., 7 h) mesoporous aluminosilicate molecular sieves before (13A) and after (13B) exposure to steam (20 vol % $H_2O$ in $N_2$) at 800° C. for 5 h: (A) 10% Al-MSU-S$_H$; (B) "ultrastable" 14% Al-MCM-41 prepared by the grafting method of Mokaya; (C) 10% Al-MCM-41 prepared by direct synthesis from conventional precursors. Isotherms are offset by 200 cc/g for clarity.

The XRD patterns in FIG. 12B clearly indicate that the 10% Al-MSU-$S_H$ mesostructure assembled from nanoclustered zeolite seeds retains a well ordered hexagonal structure upon steaming at 800° C. In comparison, the Al-MCM-41 mesostructures prepared both by direct assembly from conventional silicate and aluminate precursors and by so called ultrastable grafting reaction are almost totally destroyed by steaming. These observations are supported by a comparison of the $N_2$ sorption isotherms shown in FIGS. 13A and 13B for the same series of mesostructures. The surface areas, framework pore sizes, and pore volumes derived from these sorption isotherms are provided in Table 1. Included in the table are the unit cell parameters obtained from the XRD patterns of the samples.

TABLE 1

Textural properties of calcined mesoporous aluminosilicate molecular sieves before and after steaming

| Sample | Unit cell Dimension, $a_0$ (Å) | Surface Area (m²/g) | Pore Vol. (cc/g) | Pore Dia. (Å) |
|---|---|---|---|---|
| 10% Al MSU-$S_H$ (Example 15): | | | | |
| Before Steaming | 48.6 | 713 | 0.56 | 32.1 |
| After Steaming | 44.5 | 652 | 0.42 | 30.3 |
| 14% Al-MCM-41 (Example 14): | | | | |
| Before Steaming | 49.6 | 760 | 0.58 | 29.8 |
| After Steaming | — | 62 | 0.07 | — |
| 10% Al-MCM-41 (Example 16): | | | | |
| Before Steaming | 45.5 | 721 | 0.53 | 33.4 |
| After Steaming | — | 31 | 0.03 | — |

The 10% Al-MSU-$S_H$ sample of Example 15 retains more than 90% of its surface area and about 75% of its framework pore volume after steaming. In addition, the steam treatment improves the textural porosity of the mesostructure as evidenced by the hysteresis behavior at partial pressures above 0.50. In contrast, little or no surface area or framework pore volume is retained after steaming for either of the two Al-MCM-41 samples prepared according to Examples 14 and 16.

The unique hydrothermal stability of Al-MSU-$S_H$ is attributed at least in part to the retention of a zeolite-like connectivity of $AlO_4$ and $SiO_4$ tetrahedra upon assembling the zeolite seeds into a mesostructure. Also, the occluded carbon plays a role in contributing to the structural stability, because samples that are calcined for longer times at 541° C. or at higher temperatures to remove more carbon exhibited a somewhat larger loss in surface area and pore volume upon steaming. However, in support of the importance of a zeolite-like connectivity of $SiO_4$ and $AlO_4$ units in the framework walls, the $^{27}Al$ chemical shift of tetrahedral aluminum in as-made and calcined Al-MSU-$S_H$ occurs at δ=60 ppm, the same value as the seeds solution and within the 59–65 ppm range observed for most zeolites (Lippma, E., et al., J. Am. Chem. Soc. 108 1730 (1986)). This chemical shift value is unique among aluminosilicate mesostructures. All previously reported mesostructured aluminosilicates, including the Al-MCM-41 samples of the present work, exhibit a chemical shift of 53–56 ppm. On the basis of the relationship between $^{27}Al$ chemical shift and the mean bond angle in framework aluminosilicates provided by Lippma et al. (J. Am. Chem. Soc., 108, 1730 (1986)), the mean Al—O—Si angle is substantially smaller (by −8 degrees) for the 10% Al-MSU-$S_H$ of Example 15 than for the two Al-MCM-41 prepared as described in Examples 14 and 16.

EXAMPLE 17

Figure 14:
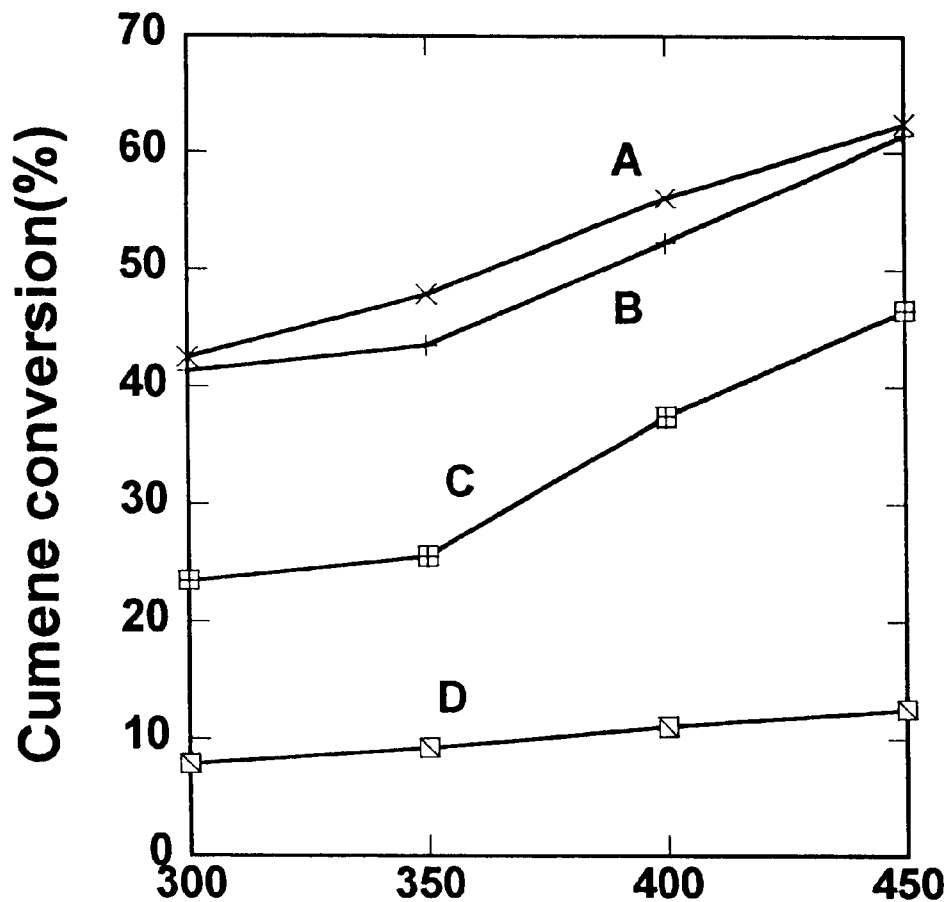
FIG. 14 is a graph showing cumene conversions over mesoporous aluminosilicates in the temperature range 300–450° C.: (A and B) conversions obtained for calcined and steamed samples of 10% Al-MSU-S$_H$, respectively; © and D) conversions for calcined and steamed samples, respectively, for 10% Al-MCM-41 prepared by direct synthesis. Reaction conditions: 6 mm i.d. fixed bed quartz reactor; 200 mg catalyst; cumene flow rate, 4.1:mol/min; $N_2$ carrier gas, 20 cc/min; conversions reported after 30 min on steam.

The acidic properties of hexagonal 10% Al-MSU-$S_H$, prepared according to the procedure described in Example 15, for cumene cracking over the temperature range 300–450° C. are compared in FIG. 14 with those of 10% Al-MCM-41 assembled according to Example 16 from conventional aluminate and silicate precursors. Although the two calcined mesostructures are nearly equivalent in activity, 10% Al-MSU-$S_H$ is a far more active catalyst after exposure to steam. This result illustrates the potential importance of nanoclustered zeolite seeds as precursors for the design of hydrothermally stable mesostructures for catalytic applications.

The use of zeolite seeds as precursors for the assembly of steam stabile aluminosilicates mesostructures is not limited to compositions containing 10 mol % aluminum. We also have used zeolite Y seeds to prepare Al-MSU-$S_H$ compositions containing 0.01–38 mol % Al with retention of the structural, steam stability, and acidic properties found for 10% Al-MSU-$S_H$. In addition, the approach is not limited to the use of type Y zeolite seeds.

EXAMPLE 18

Example 18 utilizes MFI type ZSM-5 zeolite seeds templated by tetrapropylammonium ions to form a hexagonal 2% Al-MSU-$S_H$ aluminosilicate molecular sieve with superior hydrothermal stability. In contrast to the Al-MSU-$S_H$ compositions reported in Examples 4, 5, and 6, where the $^{27}Al$ MAS NMR chemical shifts are well within the zeolitic range of 57–65 ppm, the $^{27}Al$ MAS NMR shift observed for the product of this example was equivalent to the shift found for the initial ZSM-5 seed precursor and comparable to the shifts typically found for aluminosilicate mesostructures assemble from conventional aluminate and silicate precursors (53–56 ppm). However, the resulting mesostructure showed an infrared absorption band indicative of the presence of ZSM-5 type secondary building blocks in the framework walls. The presence of a stable, zeolite-like framework wall structure for the product of this example was verified by a hydrothermal stability to both steam and boiling water.

Tetraethylorthosilicate (6.83 g) was added with stirring to 7.22 ml of 1.0 M tetrapropylammonium hydroxide and then 0.17 g of aluminum sec-butoxide was added to form a clear solution. A 75 ml portion of water was added to the stirred solution, and the solution was allowed to age at 85° C. overnight under static conditions to form a clear solution of ZSM-5 zeolite seeds. A 2.45-g portion of cetyltrimethylammonium bromide then was added under vigorous stirring for 30 minutes, and the resulting mixture was allowed to age at 100° C. under static conditions overnight. The pH of the reaction mixture was lowered to a value of 9.0 by the addition of 1.0 M sulfuric acid and the reaction mixture was aged again overnight at 100° C. under static conditions. The mesostructured precipitate was filtered, washed, dried in air and then calcined at 550° C. to remove the surfactant. The X-ray powder diffraction pattern of the calcined 2% Al-MSU-$S_H$ product exhibited four diffraction lines (100, 110, 200, 210) consistent with a hexagonal mesostructure. The $^{27}Al$ MAS NMR spectrum of the calcined product exhibited a single resonance line at 55 ppm, consistent with the same linked $AlO_4$ tetrahedral environment as in ZSM-5 seeds (see the $^{27}Al$ MAS NMR spectrum for ZSM-5 seeds in FIG. 2).

Figure 15:
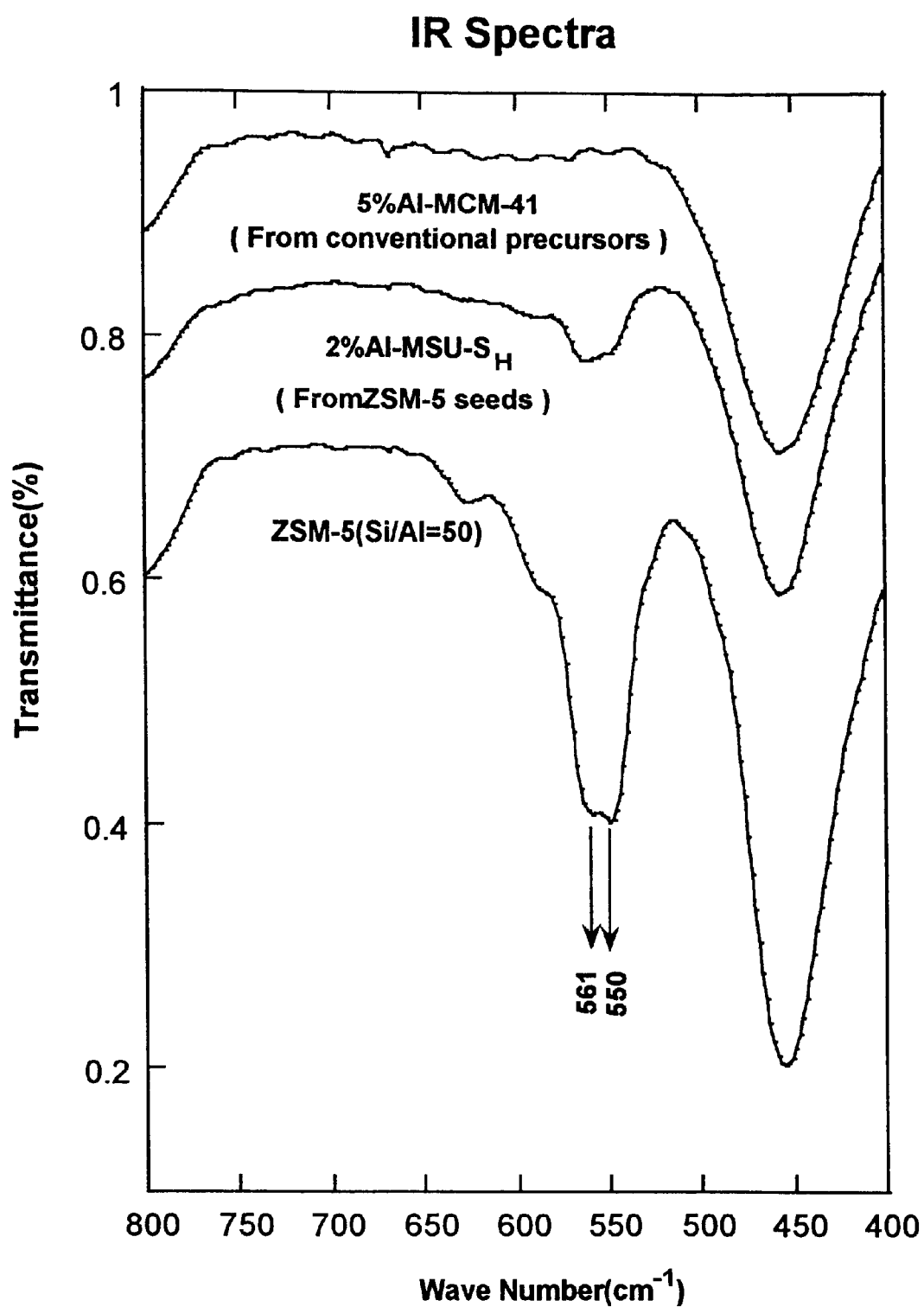
FIG. 15 provides the infrared absorption spectra in the region 400 to 800 cm$^{-1}$ for 5% Al-MCM-41 prepared from conventional precursors and for 2% Al-MSU-S$_H$ prepared from zeolite ZSM-5 seeds. Included for comparison is the spectrum of an authentic sample of ZSM-5.

Further evidence for a zeolite-like framework wall structure was obtained from the infrared absorption spectrum of the calcined 2% Al-MSU-$S_H$ mesostructure. As shown in FIG. 15, absorption bands between 500 and 600 $cm^{-1}$, consistent with the presence of secondary 5-membered ring units, are observed. Included in FIG. 15 for comparison purposes are the infrared spectra for an authentic sample of 2% Al-ZSM-5 zeolite and for a hexagonal 5% Al-MCM-41 assembled from conventional aluminate and silicate precursors. The same bands between 500–600 $cm^{-1}$ were found for the ZSM-5 zeolite, but the 5% Al-MCM-41 made from conventional precursors does not show these zeolite-like absorption bands.

Kloetstra et al (Chem. Commun., 2281 (1997)) have reported a hexagonal aluminosilicate mesostructure which on the basis of IR bands between 500 and 600 $cm^{-1}$ also contains 5-membered ring structures analogous to the secondary building blocks of ZSM-5 zeolite. This material was prepared by exchanging a conventional Al-MCM-41 with tetrapropylammonium ions and subsequently heating the exchanged mesostructure in glycerol to convert some of the framework into embryonal ZSM-5 units. However, we find upon repeating this work that the mesostructure of Kloetstra et al is hydrothermally unstable. Boiling the material in water for 5 hours or exposing it to 20% steam in nitrogen stream at 600° C. for 5 hours results in nearly the complete loss of framework mesoporosity. In contrast, the hexagonal 2% Al-MSU-$S_H$ of Example 18 retains nearly all of its framework mesoporosity under these conditions, Thus, the introduction of ZSM-5 type building blocks into the framework walls of MCM-41 by the method of Kloetstra appears to be localized to specific regions of the framework adjacent to tetrapropylammonium cations, whereas the use of zeolite seeds as precursors according to example 18 affords a more uniform framework of zeolite-like connectivity and, hence, greatly improved hydrothermal stability.

EXAMPLE 19

This example demonstrates that preparation of zeolite seeds for the assembly of hydrothermally stable aluminosilicate mesostructures is not limited to the use of sodium silicate precursor solutions containing 27 wt % $SiO_2$, 14 wt % NaOH. Sodium silicate solutions containing higher ratios of silica to sodium hydroxide are also suitable for forming the zeolite seeds needed for the supramolecular assembly of hydrothermally stable aluminosilicate mesostructures.

Example 19 illustrates the use of a sodium silicate solution containing 28.43 wt % $SiO_2$ and 8.93 wt % NaOH for preparing zeolite type Y zeolite nucleating centers (seeds) and the subsequent use of these zeolite seeds for preparing an aluminosilicate mesostructure with a zeolite-like $^{27}Al$ MAS NMR chemical shift in the range 57 to 65 ppm. The method used to prepare the seeds follows the general procedure provided by Vaughan, (U.S. Pat. No. 4,178,352) for a zeolite Y seeds composition containing 35 mole % aluminum (Si/Al=1.88). A NaOH aqueous solution containing 1.013 mole NaOH and 7.6 mole $H_2O$ was prepared and 0.54 mole $NaAlO_2$ was added to this NaOH solution under stirring until a clear solution formed. To this basic sodium aluminate solution was added 1.0 mole of sodium silicate (28.43% $SiO_2$, 8.93 wt % NaOH, 41 degree, Be',) in 6.6 mol $H_2O$ under vigorous stirring. The product set to a stiff gel within 2 minutes after mixing was completed. The above gel was called type Y zeolite seeds or nucleation centers. In order to form a mesoporous aluminosilicate the above zeolite Y seeds, 127 mol $H_2O$ was added to the diluted mixture. To the diluted mixture was added sequentially 0.5065 mole $H_2SO_4$ and 0.20 mole CTAB under stirring at room temperature for 30 minutes. The resultant mixture was further acidified with 0.15 mole $H_2SO_4$ and aged at 100° C. for 20 h. The mixture then was acidified with 0.029 mole $H_2SO_4$ under vigorous stirring and aged at 100° C. again for 20 h to obtain the as-made aluminosilicate mesostructure. The as-made mesostructure were washed thoroughly with water and dried in air. The product was calcined at 540° C. for 7 h to remove the surfactant. The calcined product exhibited a single XRD line consistent with a wormhole framework structure and denoted 35% Al-MSU-$S_W$. The corresponding basal spacing was about 5.0 nm. The chemical shift for the calcined product was 59 ppm, within the 57–65 ppm range expected for a hydrothermally stable aluminosilicate mesostructure assembled from zeolite seeds.

The sodium aluminate is prepared by reacting sodium hydroxide with an aluminum source selected from the group consisting of a soluble aluminum salt, a cationic aluminum oligomers, an aluminum hydroxide, an aluminum oxide, an aluminum alkoxide and mixtures thereof.

It is intended that the foregoing description be only illustrative of the present invention and that the present invention be limited only by the hereinafter appended claims.

We claim:

1. A hybrid mesoporous aluminosilicate-carbon composition which comprises: a framework of linked tetrahedral $SiO_4$ and $AlO_4$ units, the framework defining mesopores having an Si to Al molar ratio of between about 1000 to 1 and 1 to 1 and between 0.01 and 10 wt % carbon embedded in the mesopores, and having at least one X-ray diffraction peak corresponding to a basal spacing between about 3.0 and 15.0 nm, wherein the tetrahedral $AlO_4$ units in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 $m^2$ per gram, wherein an average pore size of the framework is between about 2.0 and 10.0 nm, and wherein a pore volume of the framework is between about 0.1 and 1.9 $cm^3$ per gram.

2. The composition of claim 1 wherein the framework has a structure which is hexagonal, cubic or wormhole-like.

3. A catalyst for a fluidized bed catalytic cracking (FCC) or hydrocracking of an organic molecule which comprises:

(a) a mesoporous aluminosilicate composition which comprises a framework of linked tetrahedral $SiO_4$ and $AlO_4$ units, the framework defining mesopores having an Si to Al molar ratio of between about 1000 to 1 and 1 to 1, and having at least one X-ray diffraction peak corresponding to a basal spacing between about 3.0 nm and 15.0 nm, wherein the tetrahedral $AlO_4$ units in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 m$^2$ per gram, wherein an average pore size of the framework is between about 2.0 and 10.0 nm, and wherein a pore volume of the framework is between about 0.1 and 1.9 cm$^3$ per gram; and (b) a binder for the aluminosilicate composition and optionally other components which facilitate the FCC.

4. A catalyst for fluidized bed catalytic cracking (FCC) or hydrocracking of an organic molecule which comprises:

(a) a mesoporous aluminosilicate-carbon composition which comprises a framework of linked tetrahedral $SiO_4$ and $AlO_4$ units, the framework defining mesopores having an Si to Al molar ratio of between about 1000 to 1 and 1 to 1 and between 0.01 and 10 wt % carbon embedded in the mesopores, and having at least one X-ray diffraction peak corresponding to a basal spacing between about 3.0 and 15.0 nm, wherein the tetrahedral $AlO_4$ units in the framework exhibit a $^{27}Al$ MAS-NMR resonance with a chemical shift between about 57 and 65 ppm relative to a 1.0 M aluminum nitrate solution as an external chemical shift reference, wherein a BET surface area is between 400 and 1300 m$^2$ per gram, wherein an average pore size of the framework is between about 2.0 and 10.0 nm, and wherein a pore volume of the framework is between about 0.1 and 1.9 cm$^3$ per gram, wherein the carbon content is between 0.01 and 10% by weight; and (b) a binder for the aluminosilicate-carbon composition and optionally other components which facilitate the FCC.

* * * * *

UNITED STATES PATENT AND TRADEMARK OFFICE
CERTIFICATE OF CORRECTION

PATENT NO. : 6,702,993 B2
DATED : March 9, 2004
INVENTOR(S) : Thomas J. Pinnavaia, Wenzhong Zhang and Yu Liu It is certified that error appears in the above-identified patent and that said Letters Patent is hereby corrected as shown below:

Column 3,
Line 22, "$OH^{31}$ / (Si+Al)" should be -- $OH^-$ / (Si+Al) --.

Column 5,
Line 44, "27Al MAS NMR" should be -- $^{27}Al$ MAS NMR --.

Column 6,
Line 35, "@ and D)" should be -- (C and D) --.

Column 7,
Line 51, "purposed" should be -- purposes --.

Column 9,
Line 41, "$^{27}Al\text{-}MSU\text{-}S_H$," should be -- $Al\text{-}MSU\text{-}S_H$, --.
Line 43, "Al MAS NMR" should be -- $^{27}Al$ MAS NMR --.

Column 10,
Line 12, "distinguish" should be -- distinguished --

Column 11,
Line 47, "vigorous" should be -- vigorously --.

Column 12,
Line 29, "that in are largely" should be -- that are largely --.
Line 42, "it is. Known" should be -- it is known --.

Column 13,
Line 8, "27Al-MAS" should be -- $^{27}Al\text{-}MAS$ --.

UNITED STATES PATENT AND TRADEMARK OFFICE
CERTIFICATE OF CORRECTION

PATENT NO. : 6,702,993 B2
DATED : March 9, 2004
INVENTOR(S) : Thomas J. Pinnavaia, Wenzhong Zhang and Yu Liu It is certified that error appears in the above-identified patent and that said Letters Patent is hereby corrected as shown below:

Column 14,
Line 27, "Hovarth-Kawazoe" should be -- Horvath-Kawazoe --.

Column 15,
Line 53, "Hovarth-Kawazoe" should be -- Horvath-Kawazoe --.

Signed and Sealed this

Thirteenth Day of July, 2004

JON W. DUDAS
*Acting Director of the United States Patent and Trademark Office*